United States Patent
Xuan et al.

(10) Patent No.: US 11,962,866 B2
(45) Date of Patent: Apr. 16, 2024

(54) INFORMATION DISPLAY AND PROCESSING METHODS AND APPARATUSES, DEVICE, AND MEDIUM

(71) Applicant: BEIJING BYTEDANCE NETWORK TECHNOLOGY CO., LTD., Beijing (CN)

(72) Inventors: Hui Xuan, Beijing (CN); Yingke Wang, Beijing (CN); Wenjing Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/330,675

(22) Filed: Jun. 7, 2023

(65) Prior Publication Data

US 2023/0319366 A1 Oct. 5, 2023

Related U.S. Application Data

(63) Continuation of application No. PCT/CN2021/135954, filed on Dec. 7, 2021.

(30) Foreign Application Priority Data

Dec. 8, 2020 (CN) .......................... 202011441733.0

(51) Int. Cl.
*H04N 21/488* (2011.01)
*G06T 13/80* (2011.01)
(Continued)

(52) U.S. Cl.
CPC ......... *H04N 21/4882* (2013.01); *G06T 13/80* (2013.01); *G06V 20/44* (2022.01); *H04N 21/2187* (2013.01); *H04N 21/47217* (2013.01)

(58) Field of Classification Search
CPC ........... H04N 21/4882; H04N 21/2187; H04N 21/47217; G06T 13/80; G06V 20/44
See application file for complete search history.

(56) References Cited

U.S. PATENT DOCUMENTS 9,473,819 B1* 10/2016 Bostick ............. H04N 21/4722
10,880,609 B2* 12/2020 Chipman ........... H04N 21/4826
(Continued)

FOREIGN PATENT DOCUMENTS

CN 105898340 A 8/2016
CN 107092417 A 8/2017
(Continued)

OTHER PUBLICATIONS

International Search Report (with English translation) and Written Opinion issued in PCT/CN2021/135954, dated Feb. 24, 2022, 11 pages provided.

*Primary Examiner* — John R Schnurr
(74) *Attorney, Agent, or Firm* — HSML P. C.

(57) ABSTRACT

Information display and processing methods and apparatuses, a device, and a medium are provided. The information display method includes: in cases where the playback mode of a target multimedia resource is a non-immersive playback mode, receiving key event information from a server, the key event information being used to indicate that, on the basis of resource data of the target multimedia resource, it has been determined that a key event has occurred; and displaying, on the playback screen of the target multimedia resource, event notification information corresponding to the key event.

20 Claims, 11 Drawing Sheets

(51) Int. Cl.
*G06V 20/40* (2022.01)
*H04N 21/2187* (2011.01)
*H04N 21/472* (2011.01)

(56) References Cited

U.S. PATENT DOCUMENTS

| | | | |
|---|---|---|---|
| 11,350,172 B2* | 5/2022 | Panchaksharaiah | .......................... H04N 21/47205 |
| 11,366,568 B1* | 6/2022 | Yue | .................... H04N 21/4826 |
| 2003/0093789 A1* | 5/2003 | Zimmerman | .......... H04H 20/59 725/35 |
| 2005/0149966 A1* | 7/2005 | Fairhurst | ............ H04N 21/4882 725/136 |
| 2006/0200842 A1* | 9/2006 | Chapman | ............. H04N 21/235 348/E7.061 |
| 2009/0100361 A1* | 4/2009 | Abello | ............... H04N 21/4782 715/764 |
| 2014/0078039 A1* | 3/2014 | Woods | ............... H04N 21/4318 345/156 |
| 2014/0157307 A1* | 6/2014 | Cox | ................. H04N 21/47214 725/34 |
| 2016/0234563 A1* | 8/2016 | Sirpal | .................... H04L 41/22 |
| 2017/0085939 A1* | 3/2017 | Gupta | ...................... H04N 5/50 |
| 2018/0270002 A1 | 9/2018 | Li | |
| 2019/0045274 A1* | 2/2019 | Parks | ................. G06Q 30/0264 |
| 2019/0079941 A1 | 3/2019 | Sarkar et al. | |
| 2020/0029102 A1* | 1/2020 | Blaney | ............... H04N 21/2668 |
| 2020/0204871 A1* | 6/2020 | Bai | .................... H04N 21/4223 |

FOREIGN PATENT DOCUMENTS

| | | |
|---|---|---|
| CN | 109525851 A | 3/2019 |
| CN | 109547819 A | 3/2019 |
| CN | 110225408 A | 9/2019 |
| CN | 110418150 A | 11/2019 |
| CN | 111246227 A | 6/2020 |
| CN | 112584224 A | 3/2021 |
| WO | 2018060715 A1 | 4/2018 |

* cited by examiner

INFORMATION DISPLAY AND PROCESSING METHODS AND APPARATUSES, DEVICE, AND MEDIUM

The present disclosure is a continuation of International Application No. PCT/CN2021/135954, filed on Dec. 7, 2021 which claims priority to Chinese Patent Application No. 202011441733.0, titled "INFORMATION DISPLAY AND PROCESSING METHODS AND APPARATUSES, DEVICE, AND MEDIUM", filed on Dec. 8, 2020 with the China National Intellectual Property Administration, both of which are incorporated herein by reference in their entireties.

FIELD

The present disclosure relates to the technical field of information processing, and in particular to an information display and processing method and apparatus, a device, and a medium.

BACKGROUND

With the rapid development of computer technology and mobile communication technology, various multimedia play platforms based on electronic devices have been widely used, greatly enriching people's daily lives. A user may easily play multimedia resource through various multimedia play platforms.

In the process of playing a multimedia resource, when the user want to view other content resource at the same time, a non-immersive play mode (such as a floating window play mode) may be applied to play the multimedia resource, allowing the user to view other content resource while keeping an eye on the multimedia resource. However, if the user is too engrossed in viewing other content resource, it is easy to miss out highlight clips of the multimedia resource in the non-immersive play mode, reducing the user's experience.

SUMMARY

In order to solve or at least partially solve the above technical problems, an information display and processing method and apparatus, a device, and a medium are provided according to the present disclosure.

In a first aspect, an information display method is provided according to the present disclosure. The method includes:
  receiving key event information from a server in a case that a play mode of a target multimedia resource is a non-immersive play mode, wherein the key event information indicates that an occurrence of a key event is determined based on resource data of the target multimedia resource; and
  displaying event prompt information corresponding to the key event, on a play screen of the target multimedia resource.

In a second aspect, an information processing method is provided according to the present disclosure. The method includes:
  acquiring resource data of a target multimedia resource;
  determining an occurrence of a key event corresponding to an event triggering condition, in a case that the resource data meeting the preset event triggering condition is detected; and
  sending key event information corresponding to the key event to an electronic device associated with the target multimedia resource, wherein the key event information indicates that the electronic device displays event prompt information corresponding to the key event on a play screen of the target multimedia resource in a case that a play mode of the target multimedia resource is a non-immersive play mode.

In a third aspect, an information display apparatus is provided according to the present disclosure. The apparatus includes:
  an event receiving unit configured to receive key event information from a server in a case that a play mode of a target multimedia resource is a non-immersive play mode, wherein the key event information indicates that an occurrence of a key event is determined based on resource data of the target multimedia resource; and
  an information display unit configured to display event prompt information corresponding to the key event, on a play screen of the target multimedia resource.

In a fourth aspect, an information processing apparatus is provided according to the present disclosure. The apparatus includes:
  a data acquisition unit configured to acquire resource data of a target multimedia resource;
  an event determination unit configured to determine an occurrence of a key event corresponding to an event triggering condition, in a case that the resource data meeting the preset event triggering condition is detected; and
  an event sending unit configured to send key event information corresponding to the key event to an electronic device associated with the target multimedia resource, wherein the key event information indicates that the electronic device displays event prompt information corresponding to the key event on a play screen of the target multimedia resource in a case that a play mode of the target multimedia resource is a non-immersive play mode.

In a fifth aspect, a computing device is provided according to the present disclosure. The computing device includes: a processor; and a memory configured to store executable instructions, wherein the processor is configured to read the executable instructions from the memory and execute the executable instructions to implement the information display method in the first aspect or the information processing method in the second aspect.

In a sixth aspect, a computer readable storage medium having a computer program stored thereon is provided according to the present disclosure. The computer program, when executed by a processor of a computing device, causes the processor to implement the information display method in the first aspect or the information processing method in the second aspect.

The technical solution according to the embodiments of the present disclosure has the following advantages compared to the existing technology.

In the information display and processing method and apparatus, a device, and a medium according to the embodiments of the present disclosure, key event information can be received in a case that a play mode of a target multimedia resource is a non-immersive play mode, where the key event information indicates that an occurrence of a key event is determined based on resource data of the target multimedia resource; and in response to the key event information, event prompt information corresponding to the key event is displayed on a play screen of the target multimedia resource to prompt a user of the occurrence of the key event, thereby preventing the user from missing out resource content which corresponds to the key event and is played in the target multimedia resource in non-immersive play mode, and improving the user experience.

BRIEF DESCRIPTION OF THE DRAWINGS

The above and other features, advantages, and aspects of the embodiments of the present disclosure will be more apparent in conjunction with the accompanying drawings and with reference to the following embodiments. Throughout the accompanying drawings, the same or similar reference numerals represent the same or similar elements. It should be understood that the drawings are schematic and components and elements are unnecessarily drawn to scale.

DETAILED DESCRIPTION OF EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments described herein. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include an additional step and/or an omitted step that is not shown herein. The scope of the present disclosure is not limited in this aspect.

The term "including" and variants thereof as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that the concepts such as "first" and "second" mentioned in the present disclosure are used to distinguish different apparatus, modules or units, and are not used to limit an sequential order or interdependence of the functions performed by the apparatus, modules or units.

It should be noted that, the modifications such as "one" and "multiple" mentioned in the present disclosure are schematic rather than restrictive, and should be understood as "one or more" by those skilled in the art, otherwise explicitly illustrated in the context.

The names of messages or information exchanged between multiple apparatuses in the embodiments of the present disclosure are only for illustrative purposes, which will not be intended to limit the scope of the messages or information.

In a process of playing a multimedia resource, the user may use a non-immersive play mode to play the multimedia resource when he wants to view other content resource at the same time. Thus, the user can view other content resource while keeping an eye on the multimedia resource.

The non-immersive play mode may at least include a floating window play mode and a split screen play mode. The non-immersive play mode is described in detail below in conjunction with FIGS. 1 to 4.

Figure 1:
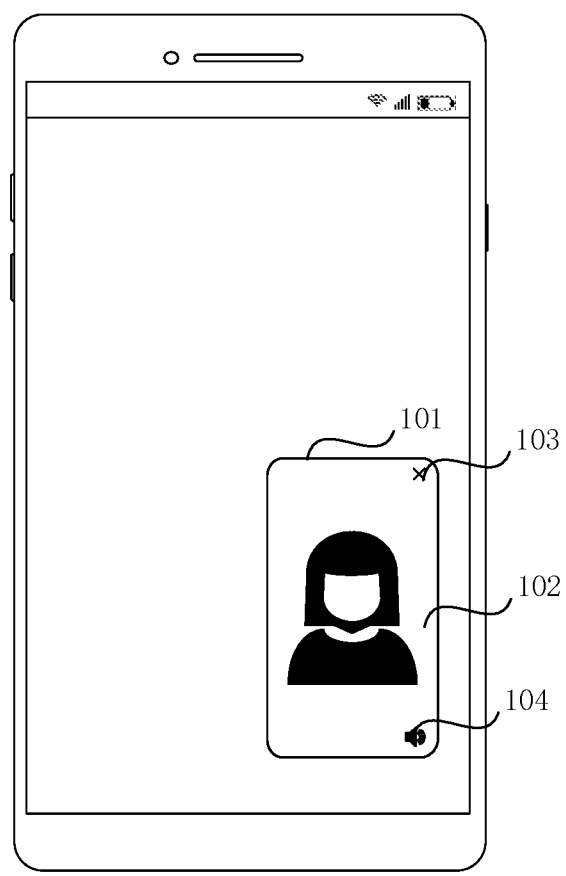
FIG. 1 is a schematic diagram of a non-immersive play interface in the related technology.

FIG. 1 shows a schematic diagram of a non-immersive play interface in the related technology. As shown in FIG. 1, the non-immersive play interface may be a floating window display interface 101, which may be used to display interaction-free stream images of a live multimedia resource (such as interaction-free stream images of a live video).

The floating window display interface 101 may be displayed in a floating manner on any interface of an electronic device. For example, the floating window display interface 101 may be displayed in a floating manner on a main screen interface of the electronic device. For another example, the floating window display interface 101 may be displayed in a floating manner on any application program interface of the electronic device.

The user may drag the floating window display interface 101 and place it in any position to change the display position of the floating window display interface 101. The user may click a close button 103 in the floating window display interface 101 to close the floating window display interface 101. The user may control volume of live multimedia resource in the floating window display interface 101 through a volume control 104 in the floating window display interface 101.

Figure 2:
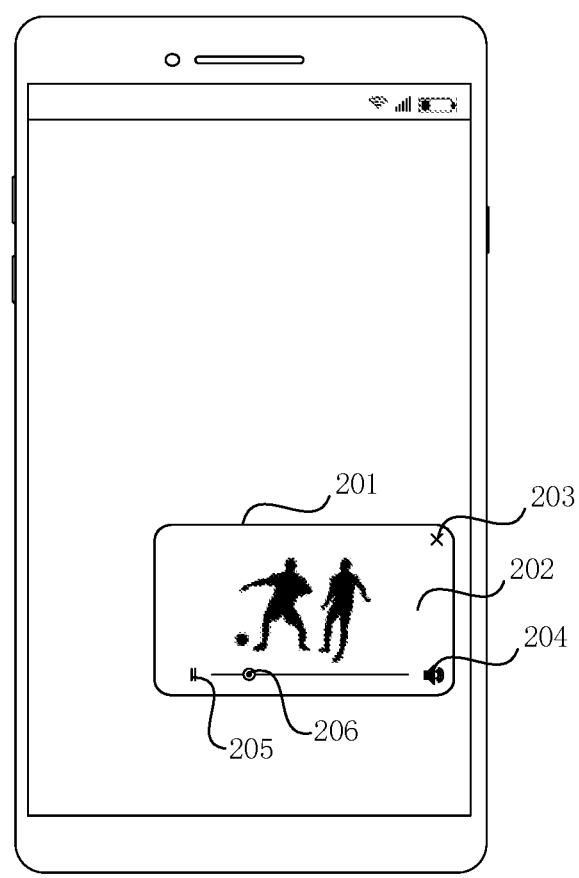
FIG. 2 is a schematic diagram of another non-immersive play interface in the related technology.

FIG. 2 shows a schematic diagram of another non-immersive play interface in the related technology. As shown in FIG. 2, the non-immersive play interface may be a floating window display interface 201, which may be used to display stream images of a video multimedia resource (such as interaction-free stream images of an online video).

The floating window display interface 201 may be displayed in a floating manner on any interface of an electronic device. For example, the floating window display interface 201 may be displayed in a floating manner on a main screen interface of the electronic device. For another example, the floating window display interface 201 may be displayed in a floating manner on any application program interface of the electronic device.

The user may drag the floating window display interface 201 and place it in any position to change the display position of the floating window display interface 201. The user may click a close button 203 in the floating window display interface 201 to close the floating window display interface 201. The user may control volume of video multimedia resource in the floating window display interface 201 through a volume control 204 in the floating window display interface 201. The user may put the video multimedia resource in the floating window display interface 201 in a play or pause state, through a play control 205 in the floating window display interface 201. The user may change playing progress of the video multimedia resource in the floating window display interface 201, through a progress bar 206 in the floating window display interface 201.

Figure 3:
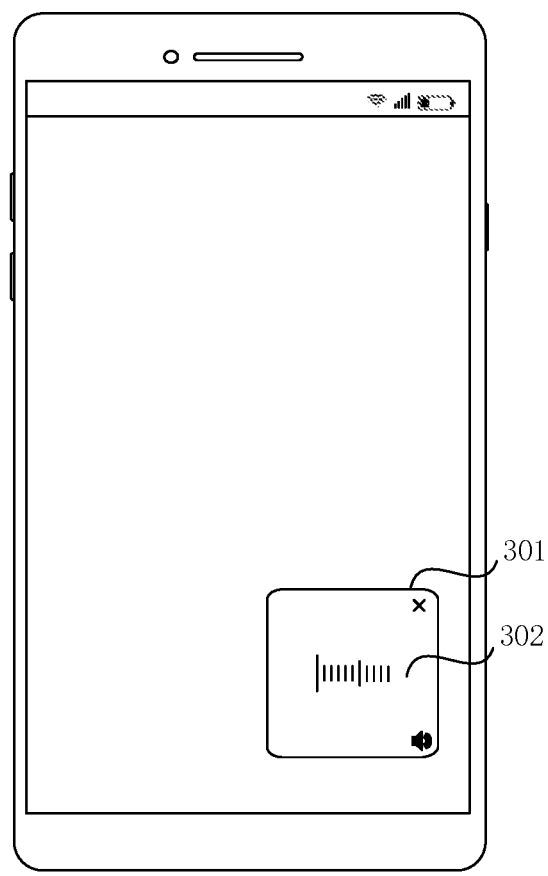
FIG. 3 is a schematic diagram of another non-immersive play interface in the related technology.

FIG. 3 shows a schematic diagram of another non-immersive play interface in the related technology. As shown in FIG. 3, the non-immersive play interface may be a floating window display interface 301, which may be used to display interaction-free stream images of an audio multimedia resource (such as interaction-free stream images of an online audio).

The method of displaying and controlling the floating window display interface 301 is similar to the examples shown in FIG. 1, which will not be repeated herein.

Figure 4:
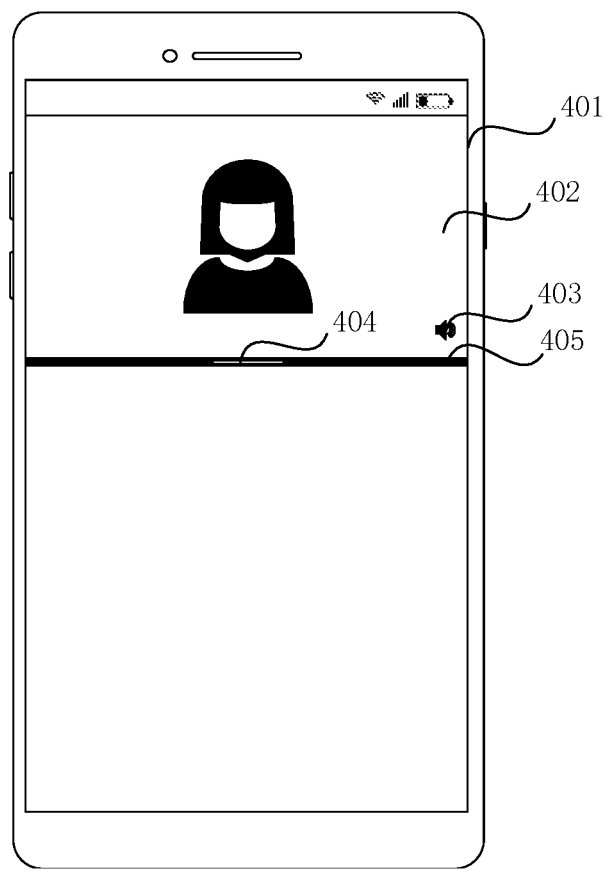
FIG. 4 is a schematic diagram of another non-immersive play interface in the related technology.

FIG. 4 shows a schematic diagram of another non-immersive play interface in the related technology. As shown in FIG. 4, the non-immersive play interface may be a split screen display interface 401, which may be used to display interaction-free stream images of a multimedia resource. The multimedia resource may include at least one of a live multimedia resource, a video multimedia resource, and an audio multimedia resource.

The split screen display interface 401 may be displayed in a split screen manner with any interface of an electronic device. For example, the split screen display interface 401 is displayed in a split screen manner with a main screen interface of the electronic device, and the split screen display interface 401 may be displayed at the top or bottom of a display screen of the electronic device. For another example, the split screen display interface 401 may be displayed in a split screen manner with any application program interface of the electronic device, and the split screen display interface 401 may be displayed at the top or bottom of the display screen for of electronic device.

The user may control volume of the multimedia resource in the split screen display interface 401, through a volume control 403 in the split screen display interface 401. The user may change a position of a boundary 405 of the split screen display interface 401 by dragging a screen proportion adjustment control 404 on the split screen display interface 401, thereby adjusting a proportion of the split screen display interface 401 to the display screen.

Based on the various non-immersive play interfaces mentioned above, the multimedia resource may be played on a screen of the electronic device in an accompanying manner by using the non-immersive play mode. The companionship nature of the non-immersive play mode requires consideration of compatibility with other interface content. Compared to full screen display, the display space in the non-immersive play mode is limited. Therefore, the display in the non-immersive play mode is mostly the display of the interaction-free stream images. In the interaction-free stream images, user interaction data of the multimedia resource (such as like data, comment data, gift giving data, bullet screen data) is removed, resulting in a lack of user interaction information.

In addition, during the play of the multimedia resource in the non-immersive play mode, although the play of the multimedia resource is maintained, the user's attention focus is no longer always on the image or sound of the multimedia resource, and there is a lag in information perception. Once highlight clips are missed, they may only be traced back through playback. But some multimedia resources have certain real-time characteristics, such as live multimedia resource. Taking e-commerce shopping live as an example, if products being followed are sold out, there may no longer be opportunities for panic buying. The cost of missing out this information directly affects the content consumption experience of the user. Especially, during the silent play of the live multimedia resource in the non-immersive play mode, live video are played in a pure image mode, which may further lead to the user missing out more information.

It may be seen that the non-immersive play mode in the related technology easily causes the user to miss out highlight resource content clips in the multimedia resource in the non-immersive play mode, reducing the user experience.

In the related technology, user interaction information of the multimedia resource is generally displayed on an interaction-free stream image, which is equivalent to reducing an area of a play interface for the multimedia resource. However, the display of the user interaction information may cause excessive user interaction information to cover a play screen of the multimedia resource, reducing the effect of playing the multimedia resource. At the same time, the display size of user interaction information will also be reduced, which may cause the user to be unable to see the interactive content clearly. Thus, this method neither conforms to the light content carrier characteristics of the non-immersive play mode, nor is it conducive to efficient information reception and understanding by users.

In order to solve the above problems, an information display method and an information processing method are provided according to embodiments of the present disclosure. The information display method and the information processing method may be applied to the architecture shown in FIG. 5, which will be described in detail in conjunction with FIG. 5.

Figure 5:
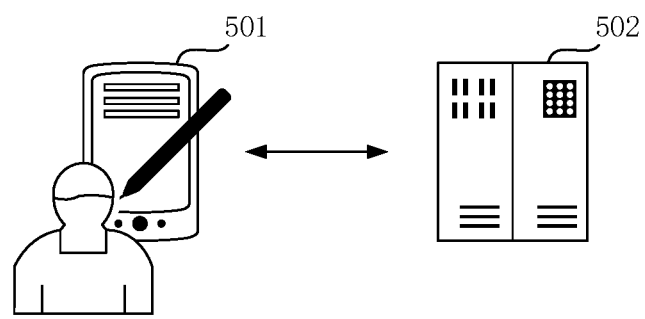
FIG. 5 is an architecture diagram of information processing according to an embodiment of the disclosure.

FIG. 5 shows an architecture diagram of information processing according to an embodiment of the present disclosure.

As shown in FIG. 5, the architecture diagram may include at least one electronic device 501 on the client side and at least one server 502 on the server side. The electronic device 501 may establish a connection and exchange information with the server 502 through network protocols such as Hyper Text Transfer Protocol over Secure Socket Layer (HTTPS). The electronic device 501 may be a device with communication function such as a mobile phone, a tablet computer, a desktop computer, a notebook computer, an in-vehicle terminal, a wearable device, an all-in-one machine, a smart home device; or a device simulated with a virtual machine or a simulator. The server 502 may be a device with storage and computing functions such as a cloud server or a server cluster.

Based on the above architecture, the user may play the multimedia resource in the non-immersive play mode on the electronic device 501. The multimedia resource may be at least one of video multimedia resource, audio multimedia resource, and live multimedia resource.

Therefore, in order to prompt the user of a key event occurred in the content of a target multimedia resource when the target multimedia resource is played in the non-immersive play mode, event prompt information may be displayed on a play screen of the target multimedia resource. Here, the multimedia resource being a live multimedia resource is taken as an example for description. The server 502 of a video live platform to which the live multimedia resource belongs may acquire resource data of the live multimedia resource (such as live data), determine that a key event corresponding to an event triggering condition occurs in the case that the live data is detected to meet the preset event triggering condition, and then send key event information corresponding to the key event to an electronic device associated with the multimedia resource, such as the electronic device playing the live multimedia resource in the non-immersive play mode.

The live multimedia resource may be played through the video live platform on the electronic device 501, and the play mode for the live multimedia resource may be set to the non-immersive play mode (such as the floating window play mode). The electronic device 501 may receive key event information sent by the server in the case that the play mode for the live multimedia resource is the non-immersive play mode, and display the event prompt information corresponding to the key event on the play screen of the target multimedia resource, in response to the key event information, to prompt the user of the occurrence of the key event, thus enabling the user to view live resource content clips corresponding to the key event in time.

Therefore, the architecture shown in FIG. 5 may prevent the user from missing out the resource content which corresponds to the key event and is played in the target multimedia resource in the non-immersive play mode, and improve the user experience.

Based on the above architecture, an information display method and an information processing method according to embodiments of the present disclosure are described below in conjunction with FIGS. 6 to 14. In some embodiments, the information display method may be executed by an electronic device, and the electronic device may be the electronic device 501 in the client shown in FIG. 5. In other embodiments, the information processing method may be executed by a server, and the server may be the server 502 in the server side shown in FIG. 5. The electronic device may be a device with communication function such as a mobile phone, a tablet, a desktop computer, a notebook computer, an in-vehicle terminal, a wearable device, an all-in-one device, a smart home device; or a device simulated with a virtual machine or a simulator. The server may be a device with storage and computing functions such as a cloud server or a cluster of servers.

A process of prompting a key event of the target multimedia resource by the electronic device is described in detail below in conjunction with FIGS. 6 to 12.

Figure 6:
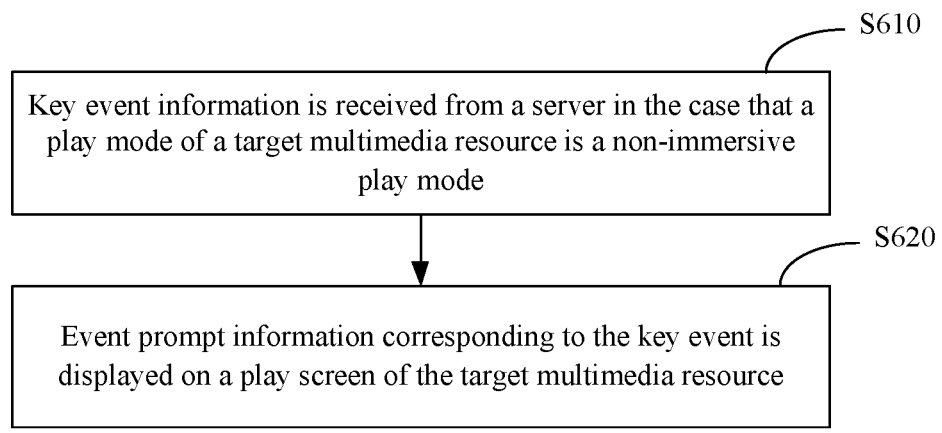
FIG. 6 is a schematic flowchart of an information display method according to an embodiment of the present disclosure.

FIG. 6 shows a schematic flowchart of an information display method according to an embodiment of the present disclosure.

As shown in FIG. 6, the information display method may include steps S610 to S620.

At S610, key event information is received from a server in the case that a play mode of a target multimedia resource is a non-immersive play mode.

In some embodiments of the present disclosure, when an electronic device detects that the play mode of the target multimedia resource is the non-immersive play mode, a key event acquisition request may be sent to the server. The server can send key event information of the target multimedia resource to the electronic device in response to the key event acquisition request. Then, the electronic device can receive the key event information of the target multimedia resource from the server.

The server may be a server that provides the target multimedia resource, that is, the server 502 as shown in FIG. 5.

In an embodiment, the non-immersive play mode may include at least one of the floating window play mode and the split screen play mode, which will not be limited herein.

In an embodiment of the present disclosure, the key event information may indicate that an occurrence of a key event is determined based on resource data of the target multimedia resource.

Specifically, the occurrence of the key event may be determined by the server based on the resource data of the target multimedia resource, which will be described in detail later.

In an embodiment of the present disclosure, the target multimedia resource may include at least one of the video multimedia resource, the audio multimedia resource, and the live multimedia resource.

The video multimedia resource may include online videos, such as TV dramas, movies, and variety shows on a video play website. The audio multimedia resource may include online audios, such as music on audio play websites or broadcasts on audio broadcasting websites.

The live multimedia resource may include a live video and a live audio.

In some embodiments, in the case that the target multimedia resource includes live multimedia resource, the live multimedia resource may include a live video and a live audio, and the resource data may include live data.

In an embodiment, the key event may include at least one of a live content key event and a live interaction key event.

In an example, the live content key event may include a key event related to a live content. For example, the live content key event may include at least one of a live content change event and a live highlight event.

In an embodiment, the live data may include live content data, and live content data may include at least one of video frame data and audio frame data. Specifically, in the case that the live multimedia resource includes a live video, the live content data may include the video frame data and/or the audio frame data. In the case that the live multimedia resource includes live audios, the live content data may include the audio frame data.

In an embodiment of the present disclosure, the live multimedia resource may be grouped into a corresponding live category, based on the resource content, such as the live content, of the live multimedia resource within a period of time.

For example, if the live content of the live multimedia resource within 0 to 15 minutes is singing a song by an anchor, the live multimedia resource within 0 to 15 minutes may be grouped into a singing category. For another example, if the live content of the live multimedia resource within 16 to 20 minutes is chat between the anchor and the audience, the live multimedia resource within 16 to 20 minutes may be grouped into a chat category. For another example, if the live content of the live multimedia resource within 21 to 30 minutes is dancing by the anchor, the live multimedia resource within 21 to 30 minutes may be grouped into a dance category.

Thus, in different time periods, as the live content of the anchor changes, the category of the live multimedia resource also changes. Therefore, the key event may include the live content change event to prompt the user viewing the live multimedia resource that the live content of the anchor is changed.

In an embodiment of the present disclosure, the different resource content, such as the live content, under different live categories have different highlights. Thus, different live highlight events may be set for different live content under different live categories.

In the case that the live category is a game category, if the live content is a first person shooting game, a live highlight event may be a "The last five people" event, an "Entering the finals" event, and a "Triple kill" event and the like. If the live content is a multiplayer online battle arena game, the live highlight event may be a "Triple kill/Quadra kill/Penta kill" event, a "Team battle moment" event, and an "Attacking crystal" event and the like. If the live content is an asymmetric battle arena game, the live highlight event may be a "Releasing successfully" event, an "Escaping successfully" event, and a "1-on-1 moment" event and the like. If the live content is a light competitive game, the live highlight event may be a "Countdown of 10 seconds" event, a "Key game" event, and a "Game point" event and the like.

In the case that the live category is an e-commerce category, the live highlight event may be a "Changing a product" event, a "Red envelope distribution" event, and a "Lucky bag distribution" event and the like.

In the case that the live category is an outdoor category, if the live content is outdoor fishing, the live highlight event may be a "Fish hooked" event.

In another example, a live interaction key event may include a key event related to user interaction. For example, the user interaction may be an interaction between the anchor and the user, or an interaction of the user for live streaming content. In an embodiment, the user may be an audience user. In addition, the live interactive key event is designed to guide the user to participate in the interaction. For example, the live interaction key event may include at least one of a key interaction event between the user and the anchor and a key interaction event related to user shopping.

In an embodiment, the live data may include live interaction data, and the live interaction data may include user interaction data and anchor interaction data. Specifically, the user interaction data may include at least one of interaction information sent by the user and an interface operation action of the user. The anchor interaction data may include at least one of interaction information sent by the anchor and an interface operation action of the anchor.

In an embodiment of the present disclosure, the interaction between the user and the anchor may include comments, likes, and rewards and the like.

In this case, the key interaction event between the user and the anchor may include a "More than ten thousand user comments" event, a "More than ten thousand user likes" event, a "User large rewards" event, a "User large gifts" event, a "Surge in user comments" event, and a "Surge in user likes" event and the like.

In an embodiment of the present disclosure, interactions related to user shopping may include clicking on a product link by the user.

In this case, a key interaction event related to user shopping may include a "Surge in product link clicks" event, a "The number of product link clicks reaching the threshold" event, and a "Growth rate of product link clicks reaching the threshold" event and the like.

In other embodiments, in the case that the target multimedia resource includes video multimedia resource, the video multimedia resource may include an online video, and the resource data may include video data.

In an embodiment, the key event may include at least one of a video content key event and a video interaction key event.

In an example, the video content key event may include a key event related to the video content. For example, the video content key event may include a play of classic clips of TV series, a play of highlight of movie protagonist, and a play of efficient moment of variety shows.

In an embodiment, the video data may include video content data, such as video frame data.

In another example, the video interaction key event may include a key event related to user interaction, such as a "Surge in user comments" event, a "The number of product link clicks reaching the threshold" event, a "Surge in user likes" event, a "The number of user likes reaching threshold" event.

In an embodiment, the video data may include user interaction data. Specifically, the user interaction data may include at least one of the interaction information sent by the user and the interface operation action of the user.

In some embodiments, in the case that the target multimedia resource includes audio multimedia resource, the audio multimedia resource may include online audios, and the resource data may include audio data.

In an embodiment, the key event may include at least one of an audio content key event and an audio interaction key event.

In an example, the audio content key event may include a key event related to audio content. For example, the audio content key event may include a refrain play event, a chorus clip play event, etc.

In an embodiment, the audio data may include audio content data, such as audio frame data.

In another example, the audio interaction key event may include a key event related to user interaction, such as a "Surge in user comments" event, a "The number of product link clicks reaching the threshold" event, a "Surge in user likes" event, a "The number of user likes reaching threshold" event.

In an embodiment, the audio data may include user interaction data. Specifically, the user interaction data may include at least one of the interaction information sent by the user and the interface operation action of the user.

At S620, event prompt information corresponding to the key event is displayed on a play screen of the target multimedia resource.

In an embodiment of the present disclosure, after receiving the key event information of the target multimedia resource from the server, the electronic device may generate event prompt information corresponding to the key event in response to the key event information, and display the event prompt information on the play screen of the target multimedia resource. Thus, the user may know that the key event occurs through the event prompt information.

In an embodiment, the electronic device may overlay the event prompt information corresponding to the key event with the play screen of the target multimedia resource.

For example, the electronic device may set a floating layer on the play screen of the target multimedia resource. The floating layer may at least partially cover the play screen of the target multimedia resource. The event prompt information corresponding to the key event may be displayed within the floating layer.

Furthermore, the event prompt information may be displayed at any position on the play screen of the target multimedia resource, such as the top, middle, or bottom of the play screen of the target multimedia resource, which will not be limited herein.

In some embodiments of the present disclosure, the event prompt information may include text information.

In an embodiment, the key event information may include a text in a specified text format, and the electronic device may generate the event prompt information corresponding to the key event based on the text, or select the event prompt information corresponding to the key event from pre-stored prompt information based on the text.

For example, if the text of the key event information is "Live content changes to singing", the event prompt information "Start singing" corresponding to the key event may be selected from the pre-stored prompt information based on the text.

In an embodiment, the key event information may also be a text that can be directly displayed to achieve a key event prompt function. The electronic device may use the text as the event prompt information directly.

For example, if the key event information is the text "Start singing", "Start singing" may be used as the event prompt information.

Figure 7:
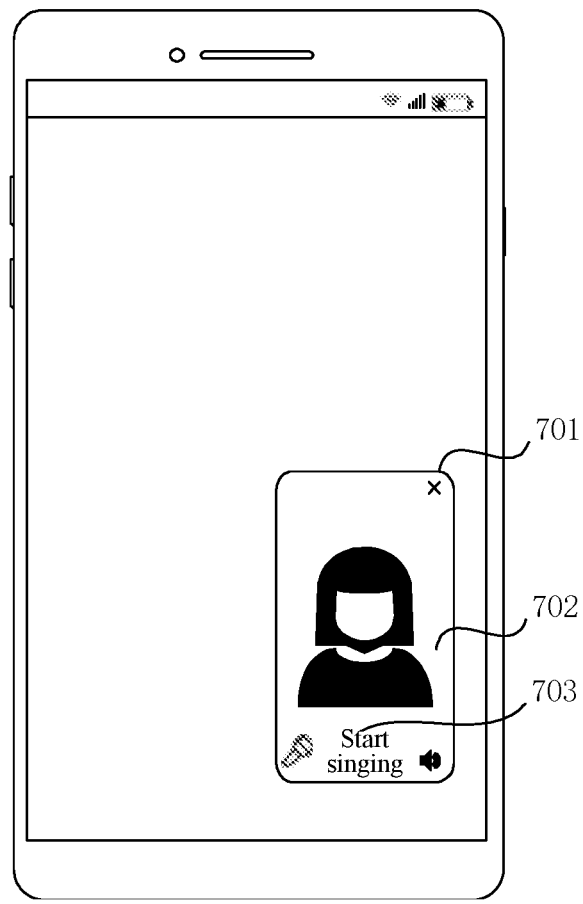
FIG. 7 is a schematic diagram of an information display interface according to an embodiment of the present disclosure.

FIG. 7 shows a schematic diagram of an information display interface according to an embodiment of the present disclosure. As shown in FIG. 7, taking the non-immersive play mode being the floating window play mode as an example, the information display interface may be a floating window display interface 701, and a live video 702 may be displayed in the floating window display interface 701. In the case that the key event is a live content change event, if the live content changes from the anchor chatting with the watching user to the anchor singing a song, event prompt information 703 may include the text "Start singing". The event prompt information 703 may be displayed at the bottom of the live video screen 702 in an overlaying manner.

Figure 8:
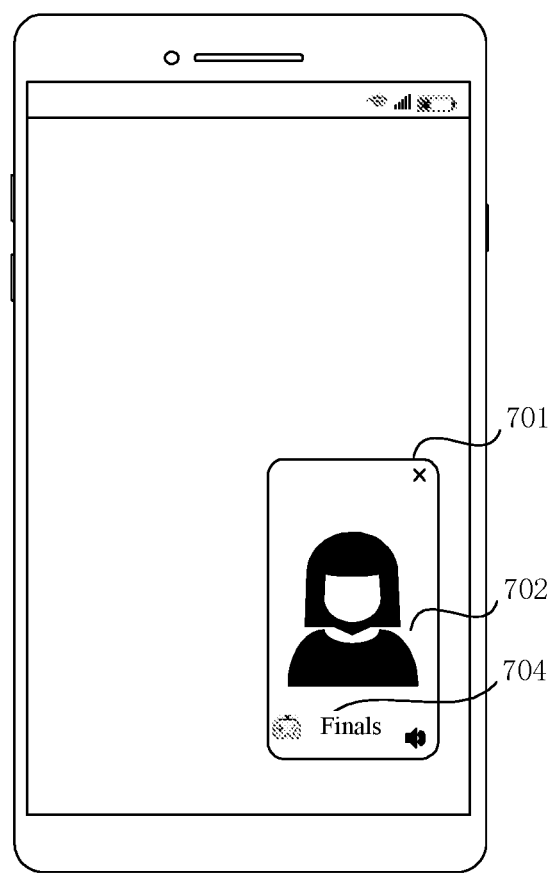
FIG. 8 is a schematic diagram of another information display interface according to an embodiment of the present disclosure.

FIG. 8 shows a schematic diagram of another information display interface according to an embodiment of the present disclosure. As shown in FIG. 8, taking the non-immersive play mode being the floating window play mode as an example, the information display interface may be the floating window display interface 701, and a live video 702 may be displayed in the floating window display interface 701. In the case that the key event is a live highlight event, the live category is a game category, the live content is a first person shooting game, and the live highlight event is an "Entering the finals" event. In this case, the event prompt information 704 may include the text "Finals", and the event prompt information 704 may be displayed at the bottom of the live video screen 702 in an overlaying manner.

Figure 9:
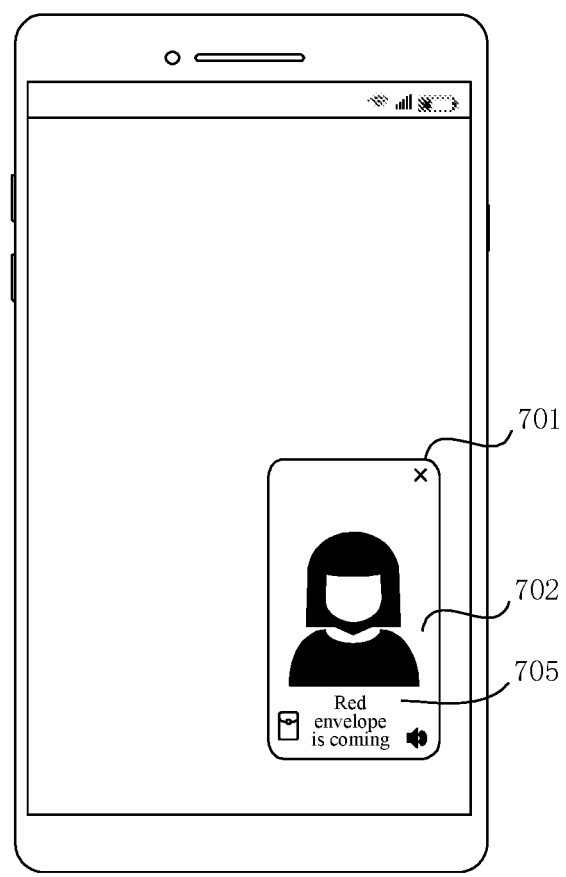
FIG. 9 is a schematic diagram of another information display interface according to an embodiment of the present disclosure.

FIG. 9 shows a schematic diagram of another information display interface according to an embodiment of the present disclosure. As shown in FIG. 9, taking the non-immersive play mode as the floating window play mode as an example, the information display interface may be the floating window display interface 701, and a live video 702 may be displayed in the floating window display interface 701. In the case that the key event is a live highlight event, if the live category is an e-commerce category and the live highlight event is a "Red envelope distribution" event, the event prompt information 705 may include the text "Red envelope is coming", and the event prompt information 705 may be displayed at the bottom of the live video screen 702 in an overlaying manner.

Thus, in the case that the target multimedia resource includes live multimedia resource, a live content key event may include two aspects: strong perception of highlights and strong communication of changes in live content in the live room, which may enable the user to perceive content changes in the live room in a non-immersive viewing scenario.

Figure 10:
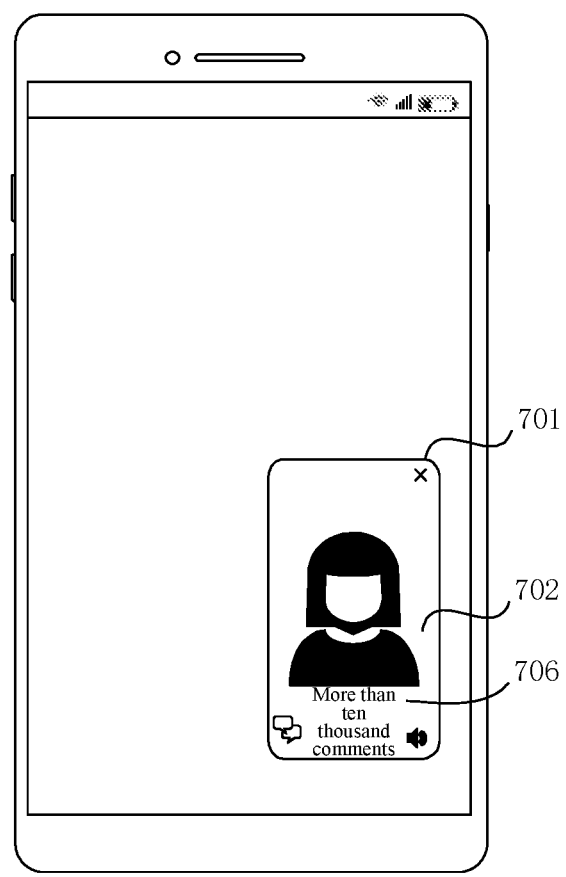
FIG. 10 is a schematic diagram of another information display interface according to an embodiment of the present disclosure.

FIG. 10 shows a schematic diagram of another information display interface according to an embodiment of the present disclosure. As shown in FIG. 10, taking the non-immersive play mode being the floating window play mode as an example, the information display interface may be the floating window display interface 701, and a live video 702 may be displayed in the floating window display interface 701. In the case that the key event is a live interaction key event, if the occurred live interaction key event is detected to be a "More than ten thousand user comments" event through interaction information sent by the user, the event prompt information 706 may include a text "More than ten thousand comments", and the event prompt information 706 may be displayed at the bottom of the live video screen 702 in an overlaying manner.

Figure 11:
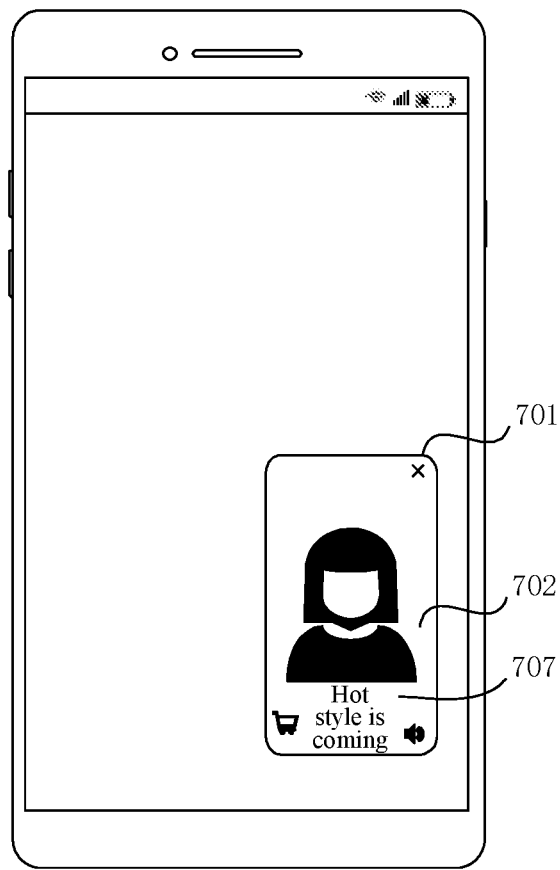
FIG. 11 is a schematic diagram of another information display interface according to an embodiment of the present disclosure.

FIG. 11 shows a schematic diagram of another information display interface according to an embodiment of the present disclosure. As shown in FIG. 11, taking the non-immersive play mode being the floating window play mode as an example, the information display interface may be the floating window display interface 701, and a live video 702 may be displayed in the floating window display interface 701. In the case that the key event is a live interaction key event, if the live category is a shopping category and the occurred live interaction key event is detected to be a "Surge in product link clicks" event through the interface operation action of the user, the event prompt information 707 may include a text "hot style is coming", and the event prompt information 707 may be displayed at the bottom of the live video screen 702 in an overlaying manner.

Thus, in the case that the target multimedia resource includes the live multimedia resource, the live interaction key event may include an establishment of a field atmosphere based on an interactive behavior between the anchor and the watching user in the live room, as well as real-time communication of interest-related information represented by an e-commerce shopping scene. Therefore, the user is able to perceive the interactive atmosphere and behavior within the live room, in a one-way information communication carrier away from the interactive behavior such as comments, likes, and gifts.

In an embodiment of the present disclosure, in the case that the target multimedia resource is played in the non-immersive play mode, key event information can be received. The key event information indicates that an occurrence of a key event is determined based on resource data of the target multimedia resource. Event prompt information corresponding to the key event is displayed, in response to the key event information, on a play screen of the target multimedia resource to prompt the user of the occurrence of the key event, thereby preventing the user from missing out the resource content corresponding to the key event played in the target multimedia resource in the non-immersive play mode, and improving the user experience.

In other embodiments of the present disclosure, the event prompt information may further include an icon.

In an embodiment, the electronic device may extract a keyword from the key event information, and determine an icon corresponding to the key event based on a correspondence relationship between the keyword and a pre-stored icon.

For example, if the key event information includes a keyword 'singing', an icon 'microphone' corresponding to the key event may be selected from pre-stored icons based on the keyword.

Therefore, condensed information for the live room may be conveyed clearly and concisely through texts and icons without affecting the viewing experience.

In some embodiments, after S620, the information display method may include:
receiving a triggering operation by a user on a play interface or icon of the target multimedia resource; and
playing the target multimedia resource in an immersive play mode in response to the triggering operation, where the immersive play mode includes a full screen play mode. For example, the play screen of the target multimedia resource is displayed in a full screen.

The triggering operation may be at least one of a click operation, a long press operation, a double click operation, which will not be limited herein.

Therefore, in the case that the target multimedia resource includes live multimedia resource, the user may return to the live room by clicking on the play interface or icon area of the target multimedia resource and play the live video in a full screen immersive experience in time. Thus, timely information communication and pullback can be implemented, so that the watching user cannot miss out highlight clips.

In other embodiments of the present disclosure, prior to S620, the information display method may include: generating an animation image corresponding to the event prompt information based on a preset animation generation method.

Correspondingly, S620 may include: overlapping the animation image with the play screen.

The animation generation method may be preset as required, which is not limited here.

In an embodiment, the animation image corresponding to the event prompt information may include an "entering" animation image, a "dynamic effect display" animation image, and an "exiting" animation image of the event prompt information. Correspondingly, the animation generation method may include an "entering" animation generation method, a "dynamic effect display" animation generation method, and an "exiting" animation generation method. Different event prompt information may have the same animation generation method or different animation generation methods, which will not be limited herein.

Therefore, in order to consider that the non-immersive play mode has a weak display immersion in the transmission and display of information, dynamic information communication is used to attract focus of the user attention.

In another embodiment of the present disclosure, in order to further improve the user experience, the display duration of the event prompt information may further be limited.

Figure 12:
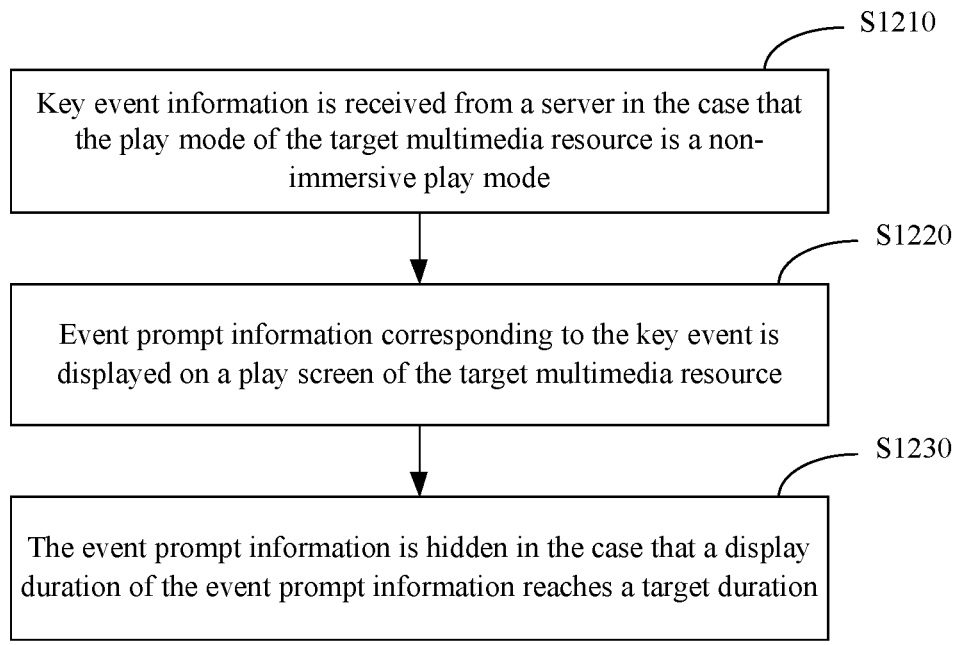
FIG. 12 is a schematic flowchart of another information display method according to an embodiment of the present disclosure.

FIG. 12 shows a schematic flowchart of an information display method according to an embodiment of the present disclosure.

As shown in FIG. 12, the information display method may include steps S1210 to S1230.

In S1210, key event information is received from a server in the case that the play mode of the target multimedia resource is a non-immersive play mode.

The key event information indicates that an occurrence of a key event is determined based on resource data of the target multimedia resource.

In S1220, event prompt information corresponding to the key event is displayed on a play screen of the target multimedia resource.

It should be noted that S1210 and S1220 are similar to S610 and S620 in the embodiment shown in FIG. 6, which will not be repeated herein.

In S1230, the event prompt information is hidden in the case that the display duration of the event prompt information reaches a target duration.

In an embodiment, the electronic device may time the display duration of the event prompt information after displaying the event prompt information, and hide the event prompt information in the case that the display duration reaches the target duration.

The target duration may be set as required. Optionally, the target duration may be a pre-set duration of a display cycle. For example, if the duration of the display cycle may be 5 seconds, the target duration may be set to 5 seconds.

In an embodiment, hiding the event prompt information may include any one of: stopping the display of the event prompt information, folding the event prompt information and continuing to display it in a background, and using the play screen to cover it.

In some embodiments of the present disclosure, in the case that the event prompt information has an "entering" animation image, a "dynamic effect display" animation image, and an "exiting" animation image, the total display duration of the "entering" animation image, the "dynamic effect display" animation image, and the "exiting" animation image of the event prompt information is the target duration.

Therefore, the event prompt information may be hidden when the event prompt information achieves the purpose of reminding, reducing the obstruction for the play screen of the target multimedia resource, and not affecting the display of event prompt information corresponding to a key event newly detected by the server.

In the present disclosure, in order to timely detect the occurrence of the key event in the resource content of the target multimedia resource, a server which provides the target multimedia resource may be used to determine the occurrence of the key event based on the resource data of the target multimedia resource. The process of the server determining the occurrence of the key event in the resource content of the target multimedia resource will be described in detail below based on FIGS. 13 to 14.

Figure 13:
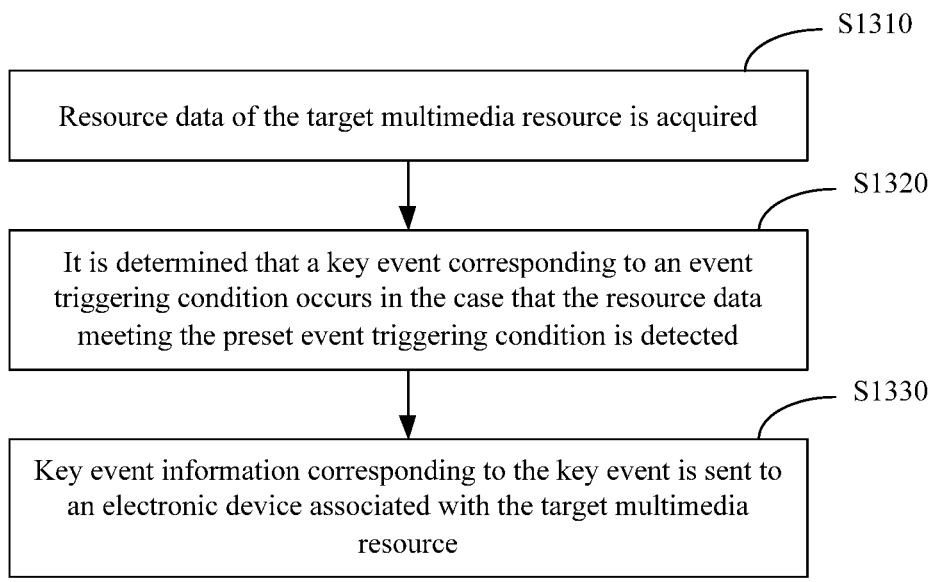
FIG. 13 is a schematic flowchart of an information processing method according to an embodiment of the present disclosure.

FIG. 13 shows a schematic flowchart of an information processing method according to an embodiment of the present disclosure.

As shown in FIG. 13, the information processing method may include the steps S1310 to S1330.

In S1310, resource data of the target multimedia resource is acquired.

In an embodiment of the present disclosure, the server which provides the target multimedia resource may acquire the resource data of the target multimedia resource in real time.

In an embodiment of the present disclosure, the target multimedia resource may include any of the video multimedia resource, the audio multimedia resource, and the live multimedia resource.

The video multimedia resource may include online videos, such as TV dramas, movies, and variety shows on video play websites. The audio multimedia resource may include online audios, such as music on audio play websites or broadcasts on audio broadcasting websites. The live multimedia resource may include a live video and a live audio.

In some embodiments, in the case that the target multimedia resource includes live multimedia resource, the live multimedia resource may include a live video and a live audio, and the resource data may include live data.

In other embodiments, in the case that the target multimedia resource includes the video multimedia resource, the video multimedia resource may include an online video, and the resource data may include video data.

In some other embodiments, in the case that the target multimedia resource includes the audio multimedia resource, the audio multimedia resource may include an online audio, and the resource data may include audio data.

It should be noted that the resource data has been described in detail in the embodiment shown in FIG. 6, which will not be repeated herein.

In S1320, it is determined that a key event corresponding to an event triggering condition occurs in the case that the resource data meeting the preset event triggering condition is detected.

In an embodiment of the present disclosure, after the server acquires the resource data of the target multimedia resource, the resource data of the target multimedia resource may be detected to determine whether the resource data of the target multimedia resource meets the preset event triggering condition. If the resource data of the target multimedia resource is detected to meet the preset event triggering condition, it may be determined that a key event corresponding to the event triggering condition occurs. If the resource data of the target multimedia resource is detected to not meet the preset event triggering condition, it may be determined that a key event corresponding to the event triggering condition is not occurred.

In an embodiment, in the case that the resource data includes resource content data, whether the resource data meets the preset event triggering condition may be detected through a content recognition technology. In the case that the resource data includes interface operation data, whether the resource data meets the preset event triggering condition may be detected through an interface detection technology. In the case that the resource data includes interaction information data, whether the resource data meets the preset event triggering condition may be detected through a data statistics technology.

In the case that the target multimedia resource includes the video multimedia resource, the resource content data may include video content data. In the case that the target multimedia resource includes the audio multimedia resource, the resource content data may include audio content data. In the case that the target multimedia resource includes the live multimedia resource, the resource content data may include live content data.

Taking the target multimedia resource being the live multimedia resource as an example, the resource data may include live content data, interaction information data and interface operation data. The live content data may include video frame data and/or audio frame data, the interaction information data may include interaction information sent by a user and interaction information sent by an anchor, and the interface operation data may include an interface operation action of the user and an interface operation action of the anchor.

In the case that the live content data includes video frame data, the server may perform video frame content recognition on the video frame data to detect whether the video frame data meets the preset event triggering condition. The server may further perform interface detection on the interface operation data to detect whether the video frame data meets the preset event triggering condition, and then capture and determine a key event in a live room in real time. Therefore, the key event in the live room may be captured and determined in real time, and transmitted to a watching user in real time, allowing the watching user to timely perceive content changes the and capture highlight information in the live room.

The server may perform data statistics and trend calculations on the interaction quantity using the interaction information data, in order to detect whether the video frame data meets the preset event triggering condition, and then objectively measure interactions (such as likes, comments, rewards, shopping) in the live room. The server transmits the interactions in real time to the watching user. Thus, the user, who detaches from interactive scenes and watches the video in the non-immersive mode, still perceives the interactive atmosphere in the live room through highly condensed interaction information.

In some embodiments of the present disclosure, in the case that the target multimedia resource includes live multimedia resource, the key event may include at least one of a live content key event and a live interaction key event.

In other embodiments of the present disclosure, in the case that the target multimedia resource includes video multimedia resource, the key event may include at least one of a video content key event and a video interaction key event.

In some embodiments of the present disclosure, in the case that the target multimedia resource includes audio multimedia resource, a key event may include at least one of an audio content key event and an audio interaction key event.

It should be noted that the key event have been described in detail in the embodiment shown in FIG. 6, which will not be repeated herein.

In S1330, key event information corresponding to the key event is sent to an electronic device associated with the target multimedia resource.

In some embodiments, the electronic device associated with the target multimedia resource may be an electronic device that acquires the target multimedia resource, that is, the electronic device on which the target multimedia resource needs to be played.

In other embodiments, the electronic device associated with the target multimedia resource may also be an electronic device that acquires the target multimedia resource and plays the target multimedia resource in a non-immersive play mode.

In an embodiment of the present disclosure, prior to S1330, the information processing method may further include: generating key event information corresponding to the key event.

In an embodiment, the server may generate rules based on preset key event information, and generate the key event information corresponding to the key event based on the event content of the occurred key event.

Furthermore, the key event information may be used to indicate that the electronic device displays event prompt information corresponding to the key event on the play screen of the target multimedia resource in the case that the play mode of the target multimedia resource is the non-immersive play mode. The above step has been described in the embodiment shown in FIG. 6, which will not be further repeated herein.

In an embodiment, the server may receive a key event acquisition request, from an electronic device which detects that the play mode of the target multimedia resource is the non-immersive play mode. The server uses electronic device as the electronic device associated with the target multimedia resource in response to the key event acquisition request, and send the key event information corresponding to the target multimedia resource to the electronic device associated with the target multimedia resource. The designated electronic device can display the event prompt information corresponding to the key event on the play screen of the target multimedia resource.

In an embodiment of the present disclosure, in the case that the play mode of the target multimedia resource is the non-immersive play mode, the electronic device can display the event prompt information corresponding to the key event on the play screen of the target multimedia resource, after receiving the key event information indicating that the occurrence of the key event is determined based on resource data of the target multimedia resource, to prompt the user of the key event that has occurred. Thus, the user is prevented from missing out the resource content corresponding to the key event played in the target multimedia resource in the non-immersive play mode, and the user experience is improved.

In another embodiment of the present disclosure, for different resource data, different ways may be used to detect that the resource data meets the preset event triggering condition, which is described in detail below.

In some embodiments, in the case that the target multimedia resource includes live multimedia resource and live data includes video frame data, detecting that the resource data meets the preset event triggering condition may include:
performing video frame content recognition on video frame data in the current time slice, to obtain video frame content information corresponding to the current time slice; and
determining that the video frame data meeting the event triggering condition is detected in the case that the video frame content information meets the preset content triggering condition.

The key event includes a live content key event.

In an embodiment, video frame data may include at least one video frame. The server may perform video frame content recognition on at least one video frame in the current time slice using an artificial intelligence technology (such as an image recognition technology), to obtain the video frame content information corresponding to the current time slice. Then, the server determines whether the video frame content information meets the preset content triggering condition. If the preset content triggering condition is met, it is determined that the video frame data (i.e. the resource data) meeting the event triggering condition is detected. If the preset content triggering condition is not met, it is determined that no video frame data meeting the event triggering condition is detected.

In an embodiment, the duration of the time slice may be set as required, which is not limited here.

In an example, the video frame content information may include a live category label, and the content triggering condition may include a case that the live category label in the current time slice is different from a live category label in the previous time slice.

In an embodiment, video frame content recognition may be performed on at least one video frame in the current time slice using an image recognition technology, to determine the live category label of the live category to which the target multimedia resource belongs in the current time slice. Then, it is determined whether the live category label in the current time slice is the same as the live category label in the previous time slice. If the live category labels are the same, it is determined that the preset content triggering condition is not met. If the live category labels are different, it is determined that the preset content triggering condition is met.

In this case, the live content key event may be a live content change event.

For example, the duration of a time slicing may be 2 minutes. The server may assign a live category label to the live content in the live room every 2 minutes (such as singing category, chat category, dancing category, outdoor category, game category, sports category, shopping category, etc.). When the live category label assigned to the live room within the current 2 minutes changes from the live category label assigned within the previous 2 minutes, it may be determined that the video frame content information meets the preset content triggering condition. Then, it may be determined that the resource data meeting the event triggering condition is detected. The key event corresponding to the event triggering condition may be a live content change event.

In another example, the video frame content information may include text information, and the content triggering condition may include text information containing a preset keyword.

In an embodiment, video frame content recognition may be performed on at least one video frame in the current time slice using an image recognition technology, to determine all pieces of text information contained in the video frame of the target multimedia resource in the current time slice. Then it is determined whether the text information in the current time slice contains the preset keyword. If the preset keyword is contained, it is determined that the preset content triggering condition is met. If the preset keyword is not contained, it is determined that the preset content triggering condition is not met.

The preset keyword may be set as required, which is not limited here.

In this case, the live broadcast content key event may be a live highlight event.

For example, the duration of a time slice may be 30 seconds, and resource content such as live content may be a first person shooting game. Taking the preset keyword being "finals" as an example, the server may detect whether the keyword "finals" is included in the video frame content information every 30 seconds. If the keyword "finals" is included, it may be determined that the video frame content information meets the preset content triggering condition. Then it is determined that the video frame data meeting the event triggering condition is detected, and the key event corresponding to the event triggering condition may be a live highlight event. From this, it is possible to prompt the watching user of highlight time of the anchor.

In another example, the video frame content information may include image information, and the content triggering condition may include image information containing preset image content.

In an embodiment, video frame content recognition may be performed on at least one video frame in the current time slice using an image recognition technology, to determine all pieces of image information contained in the video frame of the target multimedia resource in the current time slice. Then, it is determined whether the image information in the current time slice contains preset image content. If the preset image content is contained, it is determined that the preset content triggering condition is met. If the preset image content is not contained, it is determined that the preset content triggering condition is not met.

The preset image content may be set as required, which is not limited here.

In this case, the live content key event may be a live highlight event.

For example, the duration of a time slice may be 30 seconds, and the live content may be outdoor fishing. Taking the preset image content being "fish hooked" as an example, the server may detect whether the live video content contains a live video image with "fish hooked" image content every 30 seconds. If the live video image with "fish hooked" image content is included, it may be determined that the video frame content information meets the preset content triggering condition. Then, it is determined that the video frame data meeting the event triggering condition is detected, and the key event corresponding to the event triggering condition may be a live highlight event. From this, it is possible to prompt the watching user of highlight time of the anchor.

It should be noted that in a case that the target multimedia resource includes video multimedia resource and video data includes video frame data, the method of detecting that the resource data meets the preset event triggering condition is similar to the method above, which will not be repeated herein.

In other embodiments, in the case that the target multimedia resource includes audio multimedia resource and audio data includes audio frame data, detecting that the resource data meets the preset event triggering condition may include:

performing audio frame content recognition on the audio frame data in the current time slice, to obtain audio frame content information corresponding to the current time slice; and determining that the audio frame data meeting the event triggering condition is detected in the case that the audio frame content information meets the preset content triggering condition.

The key event includes an audio content key event.

In an embodiment, the audio frame data may include at least one audio frame. The server may perform the audio frame content recognition on at least one audio frame in the current time slice using an artificial intelligence technology (such as a voice recognition technology), to obtain the audio frame content information corresponding to the current time slice. Then, the server determines whether the audio frame content information meets the preset content triggering condition. If the preset content triggering condition is met, it is determined that the audio frame data meeting the event triggering condition is detected. If the preset content triggering condition is not met, it is determined that no audio frame data meeting the event triggering condition is detected.

For example, the audio frame content information may include background music, and the preset content triggering condition may be that the background music includes a preset music clip. For another example, the audio frame content information may include text information, and the preset content triggering condition may that the text information includes a preset keyword.

The preset music clip and the preset keyword may be set as required, which is not limited here.

In other embodiments, in the case that the target multimedia resource includes live multimedia resource and live data includes interface operation data, detecting that the resource data meets the preset event triggering condition may include:

determining that the interface operation data meeting the event triggering condition is detected, in the case that the interface operation data includes preset interface call information.

The key event includes a live content key event.

It should be noted that the preset interface call information may be set as required, which is not limited here.

In an embodiment, the server may acquire interface operation data in the current time slice, and the interface operation data may include at least one piece of interface call information. The server may match the interface call information in the interface operation data with preset interface call information. If the interface operation data in the current time slice includes the preset interface call information, it is determined that the interface operation data meeting the event triggering condition is detected. Otherwise, it is determined that no interface operation data meeting the event triggering condition is detected.

For example, the duration of a time slice may be 30 seconds, and live content may be e-commerce shopping. In the case that the preset interface call information is "product addition" interface call information, the server may detect whether the interface call information in the live room contains "product addition" interface call information every 30 seconds. If the interface call information in the live room contains "product addition" interface call information, it may be determined that the interface operation data meets the preset content trigger condition. Then, it is determined that the interface operation data meeting the event triggering condition is detected, and the key event corresponding to the event triggering condition may be a live highlight event.

For another example, the duration of a time slice may be 30 seconds. In the case that the preset interface call information is "red packet sending" interface call information, the server may detect whether the interface call information in the live room contains the "red packet sending" interface call information every 30 seconds. If the interface call information in the live room contains the "red packet sending" interface call information, it may be determined that the interface operation data meets the preset content triggering condition. Then, it is determined that the interface operation data meeting the event triggering condition is detected, and the key event corresponding to the event triggering condition may be a live highlight event.

In some other embodiments, in the case that the target multimedia resource includes live multimedia resource and live data includes interaction information data such as the interaction quantity of a target interaction type, detecting that the resource data meets the preset event triggering condition may include:

determining that the interaction quantity meeting the preset event triggering condition is detected when the interaction quantity in the current time slice is detected to be greater than an interaction quantity threshold corresponding to the target interaction type.

The key event includes a live interaction key event.

It should be noted that the target interaction type may be any interaction type, which will not be limited herein. Optionally, the interaction type may include universal interactive behavior types such as comments, likes, rewards, gifts that provide reverse information feedback to the anchor, as well as other interactive behavior types of users in a live room under specific categories, such as coupon collection, consultation, purchase, clicking on a product link in an e-commerce shopping scenario.

In an embodiment, the server may count the interaction quantity in the current time slice and compare the interaction quantity in the current time slice with the interaction quantity threshold corresponding to the target interaction type based on the counting result. If the comparison result shows that the interaction quantity in the current time slice is greater than the interaction quantity threshold corresponding to the target interaction type, it is determined that the interaction number meeting the preset event triggering condition is detected. Otherwise, it is determined that no interaction number meeting the preset event triggering condition is detected.

In an embodiment, the interaction quantity threshold may include a first number threshold. The first number threshold may be the product of a target average interaction quantity and a preset ratio. The target average interaction number is an average interaction quantity of the target interaction type in all time slices before the current time slice.

The preset ratio is a value greater than 1, which may be set as required and is not limited here. For example, the preset ratio may be 130%, 150%, or 170%.

In an embodiment, the server may count the interaction quantity in the current time slice, and then determine whether the interaction quantity is greater than the product of the average interaction quantity of the target interaction type in all time slices before the current time slice and the preset ratio. If the interaction quantity is greater than the product, it is determined that the interaction quantity meeting the preset event triggering condition is detected. Otherwise, it is determined that no interaction quantity meeting the preset event triggering condition is detected.

Furthermore, in order to improve recognition accuracy, the current time slice may be a time slice after the preset time slice.

For example, the duration of the time slice may be 5 seconds. The server may record the interaction quantity in a live room in the current time slice, every 5 seconds after the live room is officially created, for example, the quantity of likes, the quantity of comments, the amount of rewards, the amount of gifts, and clicks on each product link. The comparison is not performed on the interaction quantity from the first 30 seconds of the live, that is, before the seventh time slice. Therefore, the preset time slice may be the seventh time slice. Taking the preset ratio of 130% as an example, after the first 30 seconds of the live, the server compares the interaction quantity every 5 seconds with the product of the average interaction quantity in all previous time slices and 130%. If the interaction quantity is greater than the product of the average interaction quantity and 130%, it is determined that the interaction quantity meeting the preset event triggering condition is detected. Otherwise, it is determined that no interaction quantity meeting the preset event triggering condition is detected.

In an embodiment, the interaction quantity threshold may include a second quantity threshold. The second quantity threshold may be determined based on interaction quantity distribution of a target group to which the live multimedia resource belongs within a predetermined time period.

Specifically, the server may count the interaction quantity in the current time slice, and then determine whether the interaction quantity is greater than the threshold determined, based on the interaction quantity distribution of the target group to which the target multimedia resource, such as the live multimedia resource, belongs within the preset time period. If the interaction quantity is greater than the threshold, it is determined that the interaction quantity meeting the preset event triggering condition is detected. Otherwise, it is determined that no interaction quantity meeting the preset event triggering condition is detected.

The target group to which the live multimedia resource belongs may be a fan level group of the anchor of the live multimedia resource, the live category group of the live multimedia resource, or a group classified according to other methods, which will not be limited herein.

The preset time period may be set as required, which is not limited here. For example, the preset time period may be one day, one week, or one month.

In an example, the method for determining the second quantity threshold may include: counting the average interaction quantity per time slice for each live multimedia resource within the target group within a preset time period, counting the interaction quantity distribution of the average interaction quantity, and then determining the second quantity threshold based on a preset selection principle (such as the 20/80 principle).

Taking the target group of live multimedia resource being the fan level group of the anchor, a preset time period of one week and a preset selection principle of 20/80 principle as an example, the server may first calculate the interaction quantity distribution of the fan level group of the anchor within one week, and then, take the first 20% of interaction quantity as the second quantity threshold according to the 20/80 principle.

For example, the duration of a time slice may be 5 seconds. The server may record the interaction quantity in the live room in the current time slice every 5 seconds after the live room is officially created, and then compare the interaction quantity every 5 seconds with the second quantity threshold of the fan level group of the anchor in the live room. If the interaction quantity is greater than the second quantity threshold, it is determined that the interaction quantity meeting the preset event triggering condition is detected. Otherwise, it is determined that no interaction quantity meeting the preset event triggering condition is detected.

In the case that interaction types includes comments and likes, the key event may be the user comment quantity exceeding the interaction quantity threshold, such as "More than ten thousand user comments", or the user like quantity exceeding the interaction quantity threshold, such as "More than ten thousand user likes".

It should be noted that in the case that the target multimedia resource includes video multimedia resource and video data includes interaction information data, or in the case that the target multimedia resource includes audio multimedia resource and audio data includes interaction information data, the method of detecting that the resource data meets the preset event triggering condition is similar to the method above, which is not repeated here.

In another embodiment of the present disclosure, in order to further improve the user experience, when multiple key events are detected, key event information sent to the electronic device may also be selected to prompt the user of more interesting event content.

In the case of multiple key events, before S1320, the information processing method may further include: determining event priorities corresponding to the multiple key events; and determining a target key event among the multiple key events based on the event priorities.

Correspondingly, S1320 may include: sending key event information corresponding to the target key event to an electronic device associated with the target multimedia resource.

Another information processing method according to an embodiment of the present disclosure is described in detail below with reference to FIG. 14.

Figure 14:
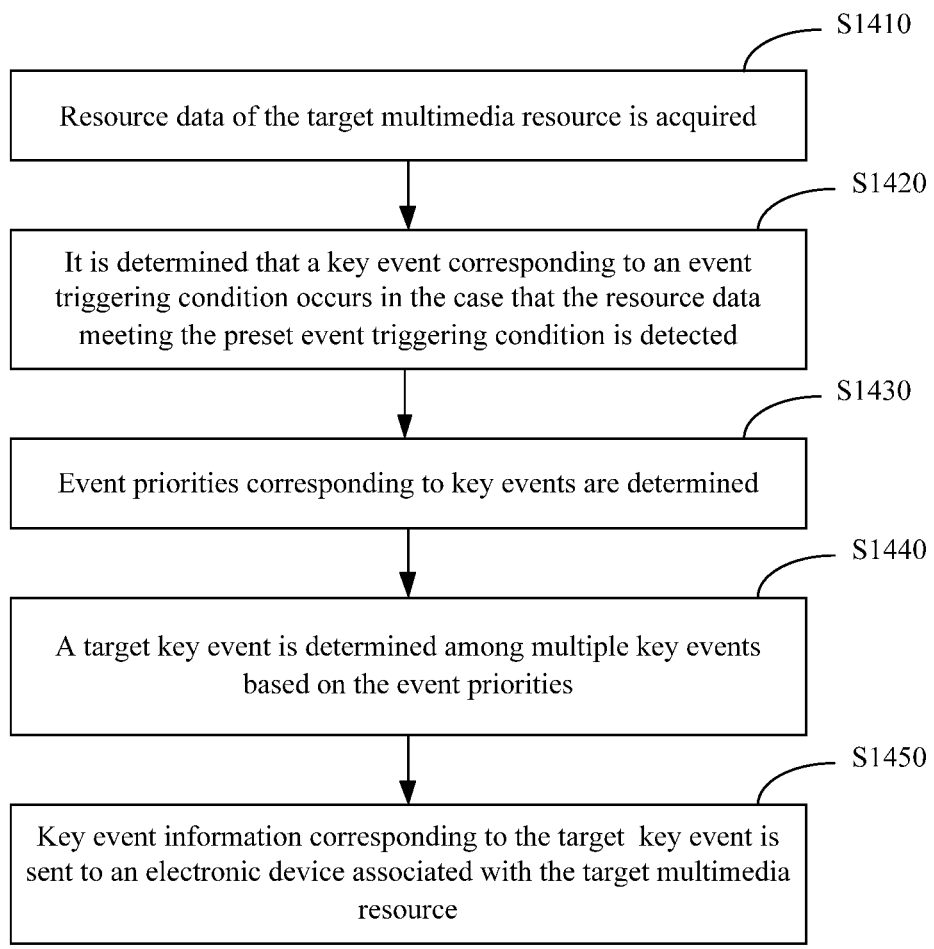
FIG. 14 is a schematic flowchart of another information processing method according to an embodiment of the present disclosure.

FIG. 14 shows a schematic flowchart of another information processing method according to an embodiment of the present disclosure.

As shown in FIG. 14, the information processing method may include steps S1410 to S1450.

In S1410, resource data of the target multimedia resource is acquired.

In S1420, it is determined that a key event corresponding to an event triggering condition occurs, in the case that the resource data meeting the preset event triggering condition is detected.

It should be noted that S1410 to S1420 are similar to S1310 to S1320 in the embodiment shown in FIG. 13, which will not be repeated herein.

In S1430, event priorities corresponding to key events are determined.

In an embodiment of the present disclosure, in the case that multiple key events occurring simultaneously is detected, the server may determine event priorities corresponding to respective key events based on a pre-set event priority determination rule.

In some embodiments, the server may preset an event type priority weight for each event type, and preset a priority level for each key event within each event type. The server may multiply the event type priority weight corresponding to the event type to which each key event belongs and the priority level of each key event within the event type, to obtain an event priority of each key event. In this case, the event priority may be a priority of the key event among all events.

In the case that the target multimedia resource includes a live multimedia resource, the key event may include at least one of a live content key event and a live interaction key event. Correspondingly, the event type may include a live content type and a live interaction type.

In other embodiments, the server may preset an event type priority for each event type, and preset a priority level for each key event within each event type. The server may take the event type priority for the event type to which each key event belongs and the priority level of each key event within the event type to which it belongs, as an event priority of each key event.

In this case, the event priority may be the priority of the key event within the event type to which the key event belongs.

In the case that the target multimedia resource includes a live multimedia resource, the key event may include at least one of a live content key event and a live interaction key event. Correspondingly, the event type may include a live content type and a live interaction type.

In a case that the target multimedia resource includes live multimedia resource, the preset event type priority and the priority level within the event type are described below with an example.

The preset event type priority may be: the live content type of a first priority, and the live interaction type of a second priority.

The priority level within the preset event type may be configured based on factors such as content criticalities, scarcities, and enjoyments for different live categories.

Taking the live category being a game as an example, the priority level within the event type may include as follows.

In a first person shooting game, a "Last five people" event is set as the first priority level, an "Entering the finals" event is set as the second priority level, and an "Triple kill" event is set as the third priority level.

In a multiplayer online battle arena game, a "Triple kill/Quadra kill/Penta kill" event is set as the first priority level, a "Team battle moment" event is set as the second priority level, and an "Attacking crystal" event is set as the third priority level.

In an Asymmetric confrontation game, a "Releasing successfully" event is set as the first priority level, an "Escaping successfully" event is set as the second priority level, and a "1-on-1 moment" event is set as the third priority level.

In a light competitive game, a "Countdown of 10 seconds" event is set as the first priority level, a "Key game" event is set as the second priority level, and a "Game point" event is set as the third priority level.

Taking the live category being shopping as an example, the priority level within the event type may be as follows. A "Surge in clicks on shopping cart" event is set as the first priority level, a "User giving large gifts" event is set as the second priority level, a "User sending large rewards" event is set as the third priority level, an "More than ten thousand user likes" event is set as the fourth priority level, and an "More than ten thousand user comments" event is set as the fifth priority level.

In S1440, a target key event is determined among multiple key events based on the event priorities.

In some embodiments of the present disclosure, in the case that the event priority is the priority of the key event among all events, the server may select the key event with the highest event priority among multiple key events and use the selected key event as the target key event.

In other embodiments of the present disclosure, in the case that the event priority is the priority of the key event within the event type to which the key event belongs, the server may first select at least one key event with the highest event type priority among multiple key events. If the number of selected key event is one, the key event is used as the target key event. If the number of selected key event is two or more, the key event with the highest priority level within that event type is selected among the selected key events. Finally, the selected key event is used as the target key event.

In an embodiment, the server may determine the target key event based on the event priority, among multiple key events in each display cycle. Then, the electronic device displays event prompt information corresponding to the target key event in the next display cycle, and then prioritizes prompting users of the occurrence of the target key event.

In S1450, key event information corresponding to the target key event is sent to the electronic device associated with the target multimedia resource.

In some embodiments of the present disclosure, the server may send the key event information corresponding to the target key event to the electronic device associated with the target multimedia resource after determining the target key event. Then, the electronic device may display the event prompt information corresponding to the target key event.

Since different key events may have different detection cycles and rules, there may be a situation that the event prompt information corresponding to multiple key events may be displayed in an overlapping manner in the same display cycle. In an embodiment of the present disclosure, the target key event determined based on the event priority may be sent to the electronic device associated with the target multimedia resource. Thus, the electronic device may only acquire one key event in one display cycle, thereby solving the problem of overlapping display of the event prompt information.

In an embodiment, the key event information is used to indicate that the electronic device displays event prompt information corresponding to the key event on a play screen for the target multimedia resource in the case that a play mode of the target multimedia resource is the non-immersive play mode.

It should be noted that the process of sending the key event information corresponding to the target key event to the electronic device associated with the target multimedia resource is similar to S1330 in the embodiment shown in FIG. 13, which will not be repeated herein.

In summary, in the information display and processing method according to the embodiments of the present disclosure, the following effects can be achieved. The occurrence of the key event can be efficiently acquired and content changes, highlights, and interaction rhythm of the multimedia resource are mastered in non-immersive viewing experience by capturing key events from the resource content of the multimedia resource and disclosing information of the key events in the non-immersive play mode. Thus, the light information dissemination nature in the non-immersive propagation mode is followed. The event prompt information of the key event is displayed after efficient and concise processing, thus improving the user experience, establishing attention relationship of the user and prompting the user stickiness of a platform.

Figure 15:
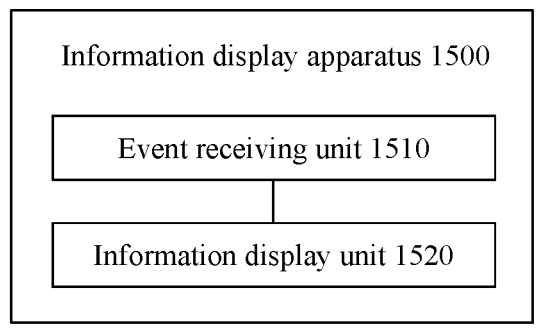
FIG. 15 is a structural schematic diagram of an information display apparatus according to an embodiment of the present disclosure.

FIG. 15 shows a structural schematic diagram of an information display apparatus according to an embodiment of the present disclosure.

In some embodiments, the information display apparatus 1500 may be provided in the electronic device above, and the electronic device may be the electronic device 501 in the client shown in FIG. 5. The electronic device may be a device with communication function such as a mobile phone, a tablet, a desktop computer, a notebook computer, an in-vehicle terminal, a wearable device, an all-in-one device, a smart home device; and may also be a device simulated with a virtual machine or a simulator.

As shown in FIG. 15, the information display apparatus 1500 may include an event receiving unit 1510 and an information display unit 1520.

The event receiving unit 1510 may be configured to receive key event information from a server in a case that a play mode of a target multimedia resource is a non-immersive play mode, where the key event information indicates that an occurrence of a key event is determined based on resource data of the target multimedia resource.

The information display unit 1520 may be configured to display event prompt information corresponding to the key event on a play screen of the target multimedia resource.

In an embodiment of the present disclosure, in the case that the play mode of the target multimedia resource is the non-immersive play mode, key event information can be received, and the key event information indicates that an occurrence of a key event is determined based on resource data of the target multimedia resource. In response to the key event information, event prompt information corresponding to the key event is displayed on a play screen of the target multimedia resource to prompt a user of the occurrence of the key event, thereby preventing the user from missing out the resource content corresponding to the key event played in the target multimedia resource in the non-immersive play mode, and improving the user experience.

In some embodiments of the present disclosure, the target multimedia resource may include a live multimedia resource and the resource data may include live data.

In some embodiments of the present disclosure, the key event may include at least one of a live content key event and a live interaction key event.

In some embodiments of the present disclosure, the information display apparatus 1500 may further include an animation generation unit. The animation generation unit may be configured to generate an animation image corresponding to the event prompt information based on a preset animation generation method.

Correspondingly, the information display unit 1520 may be further configured to display the animation image on the play screen in an overlapping manner.

In some embodiments of the present disclosure, the information display apparatus 1500 may further include an information hiding unit. The information hiding unit may be configured to hide the event prompt information in the case that a display duration of the event prompt information reaches a target duration.

It should be noted that the information display apparatus 1500 shown in FIG. 15 may perform various steps in the method embodiments shown in FIGS. 6 to 12, and implement various processes and effects in the method embodiments shown in FIGS. 6 to 12, which will not be repeated herein.

Figure 16:
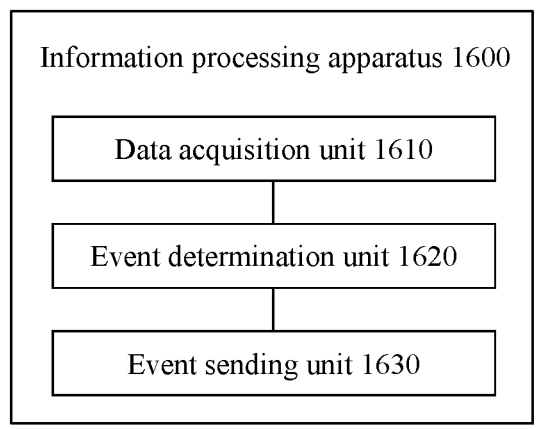
FIG. 16 is a structural schematic diagram of an information processing apparatus according to an embodiment of the present disclosure.

FIG. 16 shows a structural schematic diagram of an information processing apparatus according to an embodiment of the present disclosure.

In some embodiments, the information processing apparatus 1600 may be provided in a server, and the server may be the server 502 in the server side shown in FIG. 5. The server may be a device with storage and computing functions such as a cloud server or a server cluster.

As shown in FIG. 16, the information processing apparatus 1600 may include a data acquisition unit 1610, an event determination unit 1620, and an event sending unit 1630.

The data acquisition unit 1610 may be configured to acquire resource data of a target multimedia resource.

The event determination unit 1620 may be configured to determine that a key event corresponding to an event triggering condition occurs, in a case that that the resource data meeting the preset event triggering condition is detected.

The event sending unit 1630 may be configured to send key event information corresponding to the key event to an electronic device associated with the target multimedia resource, where the key event information indicates that the electronic device displays event prompt information corresponding to the key event on a play screen of the target multimedia resource in a case that a play mode of the target multimedia resource is a non-immersive play mode.

In an embodiment of the present disclosure, in the case that the play mode of the target multimedia resource is the non-immersive play mode, the electronic device can display event prompt information corresponding to the key event on the play screen of the target multimedia resource to prompt a user of the occurrence of the key event after receiving key event information, where the key event information indicates that the occurrence of the key event is determined based on resource data of the target multimedia resource, thereby preventing the user from missing out the resource content corresponding to the key event played in the target multimedia resource in the non-immersive play mode, and improving the user experience.

In some embodiments of the present disclosure, the target multimedia resource may include a live multimedia resource and the resource data may include live data.

In some embodiments of the present disclosure, key events may include at least one of a live content key event and a live interactive key event.

In some embodiments of the present disclosure, the live data may include video frame data.

Correspondingly, the information processing apparatus 1600 may further include a content recognition unit and a first detection unit.

The content recognition unit may be configured to perform video frame content recognition on the video frame data in a current time slice, to obtain the video frame content information corresponding to the current time slice.

The first detection unit may be configured to determine that the detected video frame data meets an event triggering condition, in a case that the video frame content information meets a preset content triggering condition.

Correspondingly, the key event may include a live content key event.

In an embodiment, the video frame content information may include a live category label, and the content triggering condition may include the live category label in the current time slice being different from a live category label in the previous time slice.

In an embodiment, the video frame content information may include text information, and the content triggering condition may include the text information containing a preset keyword.

In an embodiment, the video frame content information may include image information, and the content triggering condition may include the image information containing preset image content.

In other embodiments of the present disclosure, the live data may include interface operation data.

Correspondingly, the information processing apparatus 1600 may further include a second detection unit. The second detection unit may be configured to determine that the interface operation data meeting the event triggering condition is detected in a case that the interface operation data includes preset interface call information.

Correspondingly, the key event may include a live content key event.

In some embodiments of the present disclosure, the live data may include the interaction quantity in a target interaction type.

Correspondingly, the information processing apparatus 1600 may further include a third detection unit. The third detection unit may be configured to determine that the interaction quantity meeting the preset event triggering condition is detected, in a case that the interaction quantity in a current time slice is detected to be greater than an interaction quantity threshold corresponding to the target interaction type.

Correspondingly, the key event may include a live interaction key event.

In an embodiment, a target interaction quantity may include any of:
a first quantity threshold, where the first quantity threshold is a product of a target average interaction quantity and a preset ratio, and the target average interaction quantity is an average interaction quantity of the target interaction type in all time slices before the current time slice; and
a second quantity threshold, where the second quantity threshold is determined based on an interaction quantity distribution of a target group to which the live multimedia resource belongs within a predetermined time period.

In some embodiments of the present disclosure, the information processing apparatus 1600 may further include a priority determination unit and an event selection unit.

The priority determination unit may be configured to determine event priorities corresponding to multiple key events.

The event selection unit may be configured to determine a target key event among multiple key events based on the event priorities.

Correspondingly, the event sending unit 1630 may be further configured to send key event information corresponding to the target key event to the electronic device associated with the target multimedia resource.

It should be noted that the information processing apparatus 1600 shown in FIG. 16 may perform various steps in the method embodiments shown in FIGS. 13 to 14, and implement various processes and effects in the method embodiments shown in FIGS. 13 to 14, which will not be repeated herein.

A computing device is further provided according to an embodiment of the present disclosure. The computing device may include a processor and a memory, where the memory may be configured to store executable instructions. The processor may be configured to read the executable instructions from the memory and execute the executable instructions to implement the information display method or the information processing method in the above embodiments.

Figure 17:
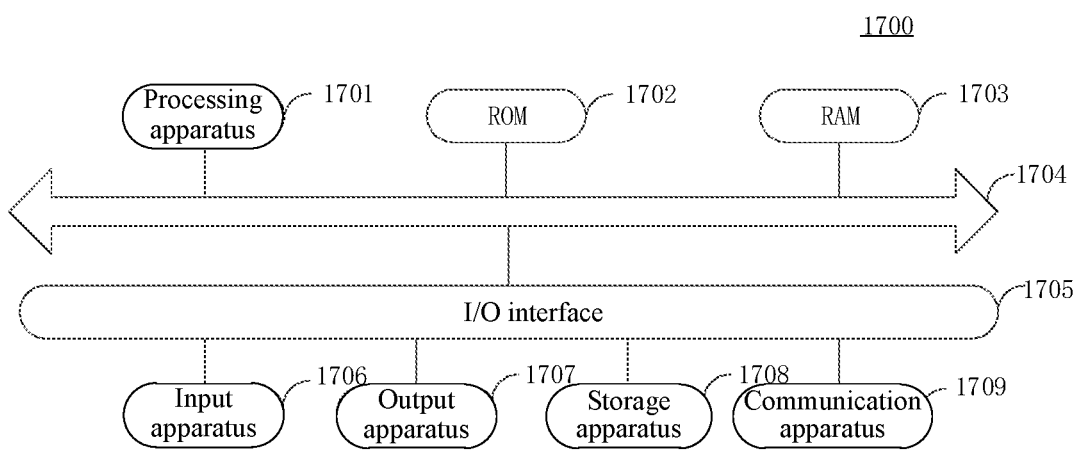
FIG. 17 is a structural schematic diagram of a computing device according to an embodiment of the present disclosure.

FIG. 17 shows a structural schematic diagram of a computing device according to an embodiment of the present disclosure. Referring to FIG. 17, a structural schematic diagram of a computing device 1700 suitable for implementing the embodiments of the present disclosure is shown.

The computing device 1700 in the embodiments of the present disclosure may be an electronic device that performs an information display method, or a server that performs an information processing method. The electronic device may include, but is not limited to, mobile terminals such as a mobile phone, a notebook computer, a digital radio receiver, a PDA (personal digital assistant), a PAD (tablet), a PMP (portable multimedia player), a vehicle-mounted terminal (such as in-vehicle navigation terminal), a wearable device; and fixed terminals such as a digital TV, a desktop computer, a smart home device. The server may be a device with storage and computing functions such as a cloud server or a server cluster.

It should be noted that the computing device 1700 shown in FIG. 17 is only an example, and should not bring any limitation to the functionality and usage scope of the embodiments of the present disclosure.

As shown in FIG. 17, the computing device 1700 may include a processing apparatus (such as a central processing unit, a graphics processor) 1701, which may execute various proper operations and processing based on a program stored in a Read-Only Memory (ROM) 1702 or a program loaded from a storage apparatus 1708 into a Random Access Memory (RAM) 1703. The RAM 1703 is further configured to store various programs and data demanded by the electronic device 1700. The processing apparatus 1701, the ROM 1702, and the RAM 1703 are connected to each other through a communication line 1704. An input/output (I/O) interface 1705 is also connected to the communication line 1704.

Generally, the I/O interface 1705 may be connected to: an input apparatus 1706, such as a touch screen, a touch panel, a keyboard, a mouse, a camera, a microphone, an accelerometer, and a gyroscope; an output apparatus 1707, such as a liquid crystal display (LCD), a speaker, and a vibrator; a storage apparatus 1708 such as a magnetic tape and a hard disk; and a communication apparatus 1709. The communication apparatus 1709 enables wireless or wired communication between the electronic device 1700 and other devices for data exchanging. Although FIG. 17 shows an electronic device 1700 having various apparatus, it should be understood that the illustrated apparatus are not necessarily required to all be implemented or embodied. Alternatively, more or fewer apparatuses may be implemented or included.

The embodiments of the present disclosure further provide a computer readable storage medium having a computer programs stored thereon. The computer program, when executed by a processor of a computing device, causes the processor to implement the information display method or the information processing method in the embodiments above.

Particularly, according to the embodiments of the present disclosure, the process described above in conjunction with flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 1709, or installed from the storage 1708, or installed from the ROM 1702. When the computer program is executed by the processing apparatus 1701, the functions defined in the information display method or the information processing method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. More specific examples of the computer readable storage medium may be, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, RF (radio frequency) and the like, or any proper combination thereof.

In some embodiments, the client and server can communicate using any currently known or future developed network protocol such as Hyper Text Transfer Protocol (HTTP), and can be interconnected with any form or medium of digital data communication (e.g., a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the computing device, or may exist alone without being assembled into the computing device.

The computer readable medium carries one or more programs. The one or more programs, when executed by the computing device, cause the computing device to:
  receive key event information from a server in a case that a play mode of a target multimedia resource is a non-immersive play mode, wherein the key event information indicates that an occurrence of a key event is determined based on resource data of the target multimedia resource; and display event prompt information corresponding to the key event on a play screen of the target multimedia resource;
  or, acquire resource data of a target multimedia resource; determine the a key event corresponding to an event triggering condition occurs in a case that the resource data meeting the preset event triggering condition is detected; and send key event information corresponding to the key event to an electronic device associated with the target multimedia resource, wherein the key event information indicates that the electronic device displays event prompt information corresponding to the key event on a play screen of the target multimedia resource in a case that a play mode of the target multimedia resource is a non-immersive play mode.

The computer program code for performing the operations disclosed in the present disclosure may be written in one or more programming languages or combinations thereof. The programming languages include, but not limit to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to the user computer through any network, including local area network (LAN) or wide area network (WAN), or may be connected to an external computer (for example, through the Internet provided by an Internet service provider).

Flowcharts and block diagrams in the drawings illustrate the architecture, functions and operations that can be implemented by a system, a method and a computer program produce according to various embodiments of the present disclosure. In this regard, each block in the flowchart or the block diagram may represent a module, a program segment, or a part of code. The module, the program segment, or the part of code includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions.

The units mentioned in the embodiments of the present disclosure may be implemented by means of software, or otherwise by means of hardware. The name of the unit does not constitute a restriction on the unit itself in some cases.

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any suitable combination thereof.

The above description includes merely preferred embodiments of the present disclosure and explanations of technical principles used. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

It should be noted that although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. Some features described in a separate embodiment may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. An information display method, comprising:
   detecting whether a target multimedia resource is played in a non-immersive play mode, wherein the non-immersive play mode comprises at least one of a floating window play mode and a split screen play mode;
   sending a key event acquisition request to a server, in a case that the target multimedia resource is played in the non-immersive play mode;
   receiving key event information sent by the server in response to the key event acquisition request, wherein the key event information indicates that an occurrence of a key event is determined based on resource data of the target multimedia resource; and
   displaying event prompt information corresponding to the key event on a play screen of the target multimedia resource.

2. The method according to claim 1, wherein the target multimedia resource comprises a live multimedia resource and the resource data comprises live data.

3. The method according to claim 2, wherein the key event comprises at least one of a live content key event and a live interaction key event.

4. The method according to claim 1, wherein before the displaying event prompt information corresponding to the key event on a play screen of the target multimedia resource, the method further comprises:
   generating an animation image corresponding to the event prompt information based on a preset animation generation method; and
   wherein the displaying event prompt information corresponding to the key event on a play screen of the target multimedia resource comprises:
   displaying the animation image on the play screen.

5. The method according to claim 1, wherein after the displaying event prompt information corresponding to the key event on a play screen of the target multimedia resource, the method further comprises:
   hiding a display of the event prompt information in a case that a display duration of the event prompt information reaches a target duration.

6. An information processing method, comprising:
acquiring resource data of a target multimedia resource;
determining that a key event corresponding to an event triggering condition occurs in a case that the resource data meeting the preset event triggering condition is detected;
receiving a key event acquisition request, wherein the key event acquisition request is sent by an electronic device associated with the target multimedia resource in response to a play of the target multimedia resource in the non-immersive play mode, and the non-immersive play mode comprises at least one of a floating window play mode and a split screen play mode; and
sending key event information corresponding to the key event to the electronic device associated with the target multimedia resource in response to the key event acquisition request, wherein the key event information indicates that the electronic device displays event prompt information corresponding to the key event on a play screen of the target multimedia resource in a case that a play mode of the target multimedia resource is the non-immersive play mode.

7. The method according to claim 6, wherein the target multimedia resource comprises a live multimedia resource and the resource data comprises live data.

8. The method according to claim 7, wherein the key event comprises at least one of a live content key event and a live interaction key event.

9. The method according to claim 7, wherein the live data comprises video frame data;
wherein the resource data meeting the preset event triggering condition is detected by:
performing a video frame content recognition on the video frame data in a current time slice, to obtain video frame content information corresponding to the current time slice; and
determining that the video frame data meeting the event triggering condition is detected in a case that the video frame content information meets a preset content triggering condition,
wherein the key event comprises a live content key event.

10. The method according to claim 9, wherein
the video frame content information comprises a live category label, and the content triggering condition comprises: a live category label of the current time slice being different from a live category label of a previous time slice; or
the video frame content information comprises text information, and the content triggering condition comprises the text information containing a preset keyword; or
the video frame content information comprises image information, and the content triggering condition comprises the image information containing a preset image content.

11. The method according to claim 7, wherein the live data comprises interface operation data;
wherein the resource data meeting the preset event triggering condition is detected by:
determining that the interface operation data meeting the event triggering condition is detected, in a case that the interface operation data comprises preset interface call information,
wherein the key event comprises a live content key event.

12. The method according to claim 7, wherein the live data comprises an interaction quantity in a target interaction type;
wherein the resource data meeting the preset event triggering condition is detected by:
determining that the interaction quantity meeting the preset event triggering condition is detected, in a case that the interaction quantity in a current time slice is detected to be greater than an interaction quantity threshold corresponding to the target interaction type,
wherein the key event comprises a live interaction key event.

13. The method according to claim 12, wherein the interaction quantity threshold comprises any one of:
a first quantity threshold, wherein the first quantity threshold is a product of a target average interaction quantity and a preset ratio, and the target average interaction quantity is an average interaction quantity of the target interaction type in all time slices before the current time slice; and
a second quantity threshold, wherein the second quantity threshold is determined based on an interaction quantity distribution of a target group to which the live multimedia resource belongs within a predetermined time period.

14. The method according to claim 6, wherein the key event comprises a plurality of key events;
wherein before the sending key event information corresponding to the key event to the electronic device associated with the target multimedia resource, the method further comprises:
determining event priorities corresponding to the plurality of key events;
determining a target key event among the plurality of key events based on the event priorities; and
wherein the sending key event information corresponding to the key event to the electronic device associated with the target multimedia resource, comprising:
sending key event information corresponding to the target key event to the electronic device associated with the target multimedia resource.

15. A computing device, comprising:
a processor; and
a memory configured to store executable instructions;
wherein the processor is configured to read the executable instructions from the memory and execute the executable instructions to:
detect whether a target multimedia resource is played in anon-immersive play mode, wherein the non-immersive play mode comprises at least one of a floating window play mode and a split screen play mode; send a key event acquisition request to a server, in a case that the target multimedia resource is played in the non-immersive play mode; receive key event information sent by the server in response to the key event acquisition request, wherein the key event information indicates that an occurrence of a key event is determined based on resource data of the target multimedia resource; and display event prompt information corresponding to the key event on a play screen of the target multimedia resource; or
acquire resource data of a target multimedia resource; determine that a key event corresponding to an event triggering condition occurs in a case that the resource data meeting the preset event triggering condition is detected; receive a key event acquisition request, wherein the key event acquisition request is sent by an electronic device associated with the target multimedia resource in response to a play of the target multimedia resource in the non-immersive play mode, and the non-immersive play mode comprises at least one of a floating window play mode and a split screen play mode; and send key event information corresponding to the key event to the electronic device associated with the target multimedia resource in response to the key event acquisition request, wherein the key event information indicates that the electronic device displays event prompt information corresponding to the key event on a play screen of the target multimedia resource in a case that a play mode of the target multimedia resource is the non-immersive play mode.

16. The computing device according to claim 15, wherein the target multimedia resource comprises a live multimedia resource and the resource data comprises live data.

17. The computing device according to claim 16, wherein the key event comprises at least one of a live content key event and a live interaction key event.

18. The computing device according to claim 15, wherein the processor is configured to read the executable instructions from the memory and execute the executable instructions to:
   generate an animation image corresponding to the event prompt information based on a preset animation generation method; and
   display the animation image on the play screen.

19. The computing device according to claim 15, wherein after the event prompt information corresponding to the key event is displayed on the play screen of the target multimedia resource, the processor is configured to read the executable instructions from the memory and execute the executable instructions to:
   hide a display of the event prompt information in a case that a display duration of the event prompt information reaches a target duration.

20. A non-transitory computer readable storage medium having a computer program stored thereon, wherein the computer program, when executed by a processor of a computing device, causes the processor to:
   detect whether a target multimedia resource is played in anon-immersive play mode, wherein the non-immersive play mode comprises at least one of a floating window play mode and a split screen play mode; send a key event acquisition request to a server, in a case that the target multimedia resource is played in the non-immersive play mode; receive key event information sent by the server in response to the key event acquisition request, wherein the key event information indicates that an occurrence of a key event is determined based on resource data of the target multimedia resource; and display event prompt information corresponding to the key event on a play screen of the target multimedia resource; or
   acquire resource data of a target multimedia resource; determine that a key event corresponding to an event triggering condition occurs in a case that the resource data meeting the preset event triggering condition is detected; receive a key event acquisition request, wherein the key event acquisition request is sent by an electronic device associated with the target multimedia resource in response to a play of the target multimedia resource in the non-immersive play mode, and the non-immersive play mode comprises at least one of a floating window play mode and a split screen play mode; and send key event information corresponding to the key event to the electronic device associated with the target multimedia resource in response to the key event acquisition request, wherein the key event information indicates that the electronic device displays event prompt information corresponding to the key event on a play screen of the target multimedia resource in a case that a play mode of the target multimedia resource is a non-immersive play mode.

* * * * *